US011975939B2

(12) United States Patent
Miyagawa

(10) Patent No.: US 11,975,939 B2
(45) Date of Patent: May 7, 2024

(54) SHEET SUCTION DEVICE, SHEET CONVEYOR, AND PRINTER

(71) Applicant: Hiroaki Miyagawa, Ibaraki (JP)

(72) Inventor: Hiroaki Miyagawa, Ibaraki (JP)

(73) Assignee: RICOH COMPANY, LTD., Tokyo (JP)

( * ) Notice: Subject to any disclaimer, the term of this patent is extended or adjusted under 35 U.S.C. 154(b) by 14 days.

(21) Appl. No.: 17/842,780

(22) Filed: Jun. 17, 2022

(65) Prior Publication Data

US 2023/0002180 A1 Jan. 5, 2023

(30) Foreign Application Priority Data

Jun. 30, 2021 (JP) ................................ 2021-109200

(51) Int. Cl.
*B65H 5/22* (2006.01)
*B41J 11/00* (2006.01)

(52) U.S. Cl.
CPC .......... *B65H 5/226* (2013.01); *B41J 11/0085* (2013.01); *B65H 2557/37* (2013.01)

(58) Field of Classification Search
CPC ................ B65H 5/226; B65H 2557/37; B65H 2406/332; B65H 2406/3612; B65H 2406/362; B65H 2406/3622; B65H 2511/10; B65H 2511/11; B65H 2511/12; B65H 2801/21; B65H 2801/12; B41J 11/0085; B41J 13/226
See application file for complete search history.

(56) References Cited

U.S. PATENT DOCUMENTS 8,469,507 B2 6/2013 Fukui
2012/0068401 A1 3/2012 Kondo et al.
2014/0176655 A1* 6/2014 Hattori .................. B65H 5/085 271/11
2020/0039772 A1* 2/2020 Miyagawa ............... B65H 7/16
(Continued)

FOREIGN PATENT DOCUMENTS

JP 2020-019637 2/2020

OTHER PUBLICATIONS

Extended European Search Report dated Nov. 25, 2022 in European Patent Application No. 22179880.4, 7 pages.

*Primary Examiner* — Justin Seo
*Assistant Examiner* — Tracey M McMillion
(74) *Attorney, Agent, or Firm* — XSENSUS LLP

(57) ABSTRACT

A sheet suction device includes a drum having multiple suction ports in a circumferential surface of the drum, the drum configured to bear a sheet on the circumferential surface and rotate in a circumferential direction of the drum, and a suction device configured to suck the sheet through the multiple suction ports to attract the sheet on the circumferential surface. The drum includes multiple suction regions aligned in the circumferential direction on the circumferential surface, each of the multiple suction regions includes the multiple suction ports aligned in the circumferential direction and in an axial direction of the drum on the circumferential surface, the multiple suction regions include an upstream region, a middle region, and a downstream region in the circumferential direction, and the middle region has the multiple suction ports at both outer sides in the axial direction of the drum.

16 Claims, 36 Drawing Sheets

(56) References Cited

U.S. PATENT DOCUMENTS

| | | | |
|---|---|---|---|
| 2021/0229942 | A1 | 7/2021 | Miyagawa |
| 2021/0237491 | A1 | 8/2021 | Miyagawa |
| 2021/0237994 | A1 | 8/2021 | Miyagawa |
| 2021/0237995 | A1 | 8/2021 | Miyagawa |

* cited by examiner

SHEET SUCTION DEVICE, SHEET CONVEYOR, AND PRINTER

CROSS-REFERENCE TO RELATED APPLICATIONS

This patent application is based on and claims priority pursuant to 35 U.S.C. § 119(a) to Japanese Patent Application No. 2021-109200, filed on Jun. 30, 2021, in the Japan Patent Office, the entire disclosure of which is hereby incorporated by reference herein.

BACKGROUND

Technical Field

Aspects of the present disclosure relate to a sheet suction device, a sheet conveyor, and a printer.

Related Art

A printer includes a rotation member such as a drum and performs printing while bearing a sheet on the drum to convey the sheet, for example.

A sheet conveyor includes a bearer, multiple suction holes, a suction device, a first member, and multiple holes. The bearer bears the sheet on a peripheral surface of the bearer and rotates. The multiple suction holes are formed in a bearing region of the bearer to bear the sheet on the bearer. The suction device sucks the sheet through the multiple suction holes. The first member is interposed between the multiple suction holes and the suction device.

The multiple holes are respectively connectable to the suction holes. The sheet conveyor includes a second member that rotates in conjunction with a rotation of the bearer The first member is rotated to change a number of the suction holes communicating with the suction device in the multiple suction holes. The multiple suction holes in the bearing region are disposed in a circumferential direction and an axial direction of a bearer.

SUMMARY

A sheet suction device includes a drum having multiple suction ports in a circumferential surface of the drum, the drum configured to bear a sheet on the circumferential surface and rotate in a circumferential direction of the drum, and a suction device configured to suck the sheet through the multiple suction ports to attract the sheet on the circumferential surface. The drum includes multiple suction regions aligned in the circumferential direction on the circumferential surface, each of the multiple suction regions includes the multiple suction ports aligned in the circumferential direction and in an axial direction of the drum on the circumferential surface, the multiple suction regions include an upstream region, a middle region, and a downstream region in the circumferential direction, and the middle region has the multiple suction ports at both outer sides in the axial direction of the drum.

The sheet suction device according to the present embodiment can reduce lifting of the sheet from the bearing surface of the bearing member.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
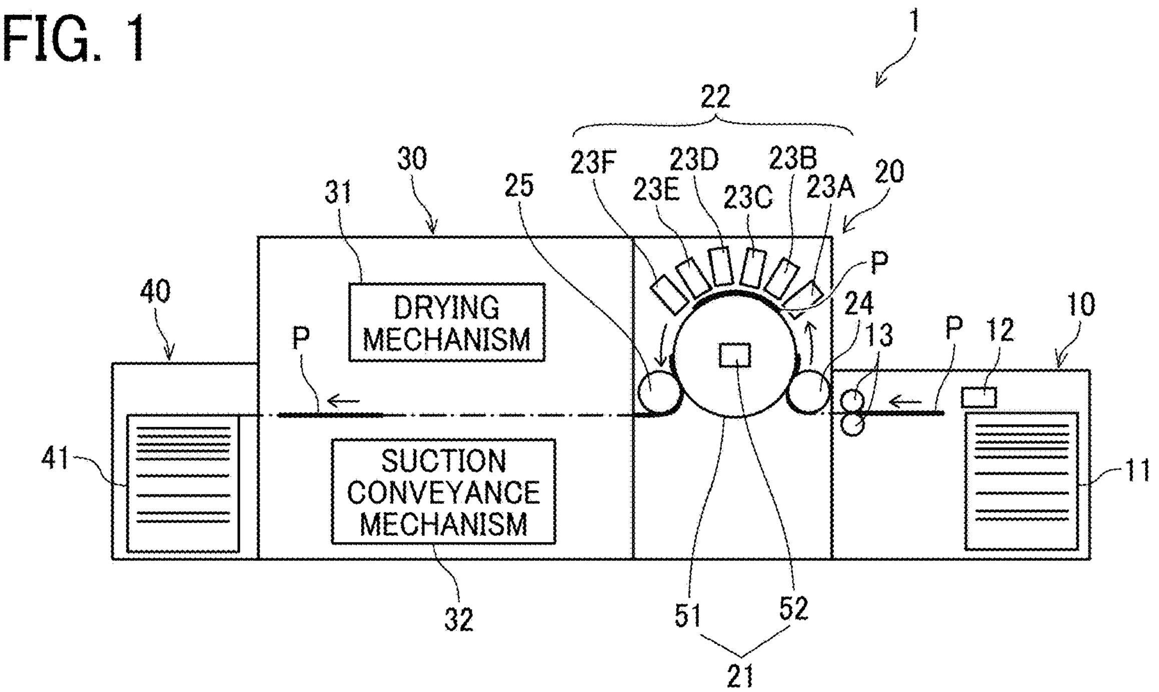
FIG. 1 is a schematic side view of a printer according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a”, “an”, and “the” are intended to include the plural forms as well, unless the context clearly indicates otherwise.

It will also be understood that when an element is referred to as being “connected” or “coupled” to another element, it can be directly connected or coupled to another element or intervening elements may be present.

In contrast, when an element is referred to as being “directly connected” or “directly coupled” to another element, there are no intervening elements present. Referring now to the drawings, wherein like reference numerals designate identical or corresponding parts throughout the several views, embodiments of the present disclosure are described below.

Referring now to the drawings, wherein like reference numerals designate identical or corresponding parts throughout the several views, embodiments of the present disclosure are described below.

Next, a printer 1 according to a first embodiment of the present disclosure is described with reference to FIGS. 1 and 2.

FIG. 1 is a schematic side view of the printer 1 according to the first embodiment of the present disclosure.

Figure 2:
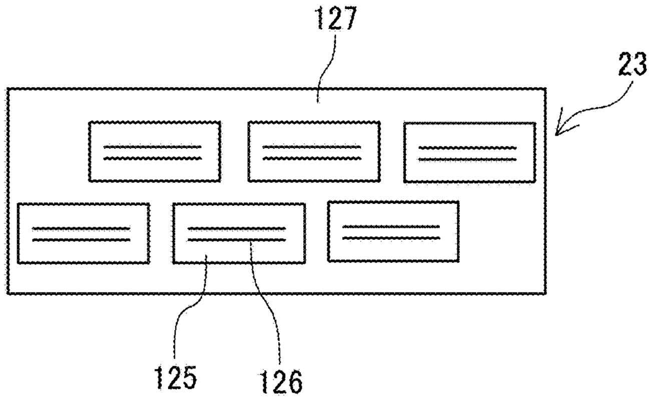
FIG. 2 is a plan view of a discharge unit of the printer.

FIG. 2 is a plan view of an example of a discharge unit 23 of the printer 1.

The printer 1 includes a loading device 10, a printing device 20, a drying device 30, and an ejection device 40. The printer 1 applies a liquid to a sheet P conveyed from the loading device 10 by the printing device 20 to perform desired printing, dries the liquid adhering to the sheet P by the drying device 30, and ejects the sheet P to the ejection device 40.

The loading device 10 includes a loading tray 11 on which a plurality of sheets P are stacked, a feeding unit 12 to separate and feed the sheets P one by one from the loading tray 11, and a resist roller pair 13 to feed the sheet P to the printing device 20.

Any feeding unit 12 such as a device using a roller or a device using air suction may be used as the feeding unit 12. The sheet P delivered from the loading tray 11 by the feeding unit 12 is delivered to the printing device 20 by the resist roller pair 13 being driven at a predetermined timing after a leading end of the sheet P reaches the resist roller pair 13.

The printing device 20 includes a sheet conveyor 21 to convey the sheet P. The sheet conveyor 21 includes a drum 51 and a suction device 52. The drum 51 is a bearer (rotating member) that bears the sheet P on a circumferential surface of the drum 51 and rotates. The suction device 52 generates a suction force on the circumferential surface of the drum 51.

The printing device 20 includes a liquid discharge device 22 that discharges the liquid toward the sheet P borne on the drum 51 of the sheet conveyor 21 to apply the liquid onto the sheet P.

The printing device 20 further includes a transfer cylinder 24 and a delivery cylinder 25. The transfer cylinder 24 receives the sheet P fed from the resist roller pair 13 and transfers the sheet P to the drum 51. The delivery cylinder 25 delivers the sheet P conveyed by the drum 51 to the drying device 30.

A leading end of the sheet P conveyed from the loading device 10 to the printing device 20 is gripped by a sheet gripper provided on a surface of the transfer cylinder 24 and is conveyed in accordance with a rotation of the transfer cylinder 24. The transfer cylinder 24 forwards the sheet P to the drum 51 at a position opposite (facing) the drum 51.

Similarly, the drum 51 includes a sheet gripper on a surface of the drum 51, and the leading end of the sheet P is gripped by the sheet gripper of the drum 51. Multiple suction holes are dispersedly formed on the surface of the drum 51. The suction device 52 generates a suction airflow from desired multiple suction holes of the drum 51 toward an interior of the drum 51. The suction device 52 serves as a suction device.

The sheet gripper 106 (see FIG. 4) of the drum 51 grips the leading end of the sheet P forwarded from the transfer cylinder 24 to the drum 51, and the sheet P is attracted to and borne on the drum 51 by the suction airflow generated by the suction device 52. As the drum 51 rotates, the sheet P is conveyed.

The liquid discharge device 22 includes discharge units 23 (23A to 23F) that discharge liquids. For example, the discharge unit 23A discharges a liquid of cyan (C), the discharge unit 23B discharges a liquid of magenta (M), the discharge unit 23C discharges a liquid of yellow (Y), and the discharge unit 23D discharges a liquid of black (K), respectively. Further, the discharge units 23E and 23F are used to discharge any one of YMCK or special liquid such as white and gold (silver). Further, the liquid discharge device 22 may further include a discharge unit to discharge a processing liquid such as a surface coating liquid.

The discharge unit 23 is a full line head and includes multiple liquid discharge heads 125 arranged in a staggered manner on a base 127 (see FIG. 2). Each of the multiple liquid discharge heads 125 includes multiple nozzle arrays 126 and multiple nozzles arranged in each of the multiple nozzle arrays 126, for example, as illustrated in FIG. 2. Hereinafter, the "liquid discharge head 125" is simply referred to as a "head 125".

A discharge operation of each of the discharge units 23 of the liquid discharge device 22 is controlled by drive signals corresponding to print information. When the sheet P borne on the drum 51 passes through a region facing the liquid discharge device 22, the liquid of each color is discharged from the discharge units 23, and an image corresponding to the print information is printed on the sheet P.

The drying device 30 includes a drying mechanism 31 and a suction conveyance mechanism 32. The drying mechanism 31 dries the liquid adhered on the sheet P by the printing device 20. The suction conveyance mechanism 32 conveys (suctions and conveys) the sheet P while suctioning the sheet P conveyed from the printing device 20 onto the suction conveyance mechanism 32.

After the sheet P conveyed from the printing device 20 is received by the suction conveyance mechanism 32, the sheet P is conveyed to pass through the drying mechanism 31 and delivered to the ejection device 40.

When the sheet P passes through the dying mechanism 31, the liquid on the sheet P is subjected to a drying process by the drying mechanism 31. Thus, the liquid component such as water in the liquid evaporates. The colorant contained in the liquid is fixed on the sheet P. Thus, curling of the sheet P is reduced.

The ejection device 40 includes an ejection tray 41 on which multiple sheets P are stacked. The sheets P conveyed from the drying device 30 are sequentially stacked and held on the ejection tray 41 of the ejection device 40.

The printer 1 can further include, for example, a pretreatment device disposed upstream from the printing device 20, or a post-processing device disposed between the drying device 30 and the ejection device 40. The pretreatment device performs pretreatment on the sheet P. The post-processing device performs post-processing of the sheet P onto which the liquid has been applied.

For example, the pretreatment device may perform a pretreatment process that applies a treatment liquid onto the sheet P before image is printed on the sheet P. The treatment liquid reacts with the liquid to reduce bleeding of the liquid to the sheet P. However, the content of the pretreatment process is not particularly limited to the process as described above. Further, the post-processing device may perform a sheet reversing process and a binding process to bind the multiple sheets P, for example. The sheet reversing process reverses the sheet P, on which image has been printed by the printing device 20, and conveys the reversed sheet P again to the printing device 20 to print on both sides of the sheet P.

The printing device 20 according to the first embodiment includes the discharge unit 23 to discharge a liquid. However, the printing device 20 according to the first embodiment may perform printing by a method other than the liquid discharge operation such as an electrographic method.

The sheet suction device 50 according to a first embodiment of the present disclosure is described with reference to FIG. 3. The sheet conveyor 21 (see FIG. 1) includes the sheet suction device 50 that includes the drum 51 and suction device 52.

Figure 3:
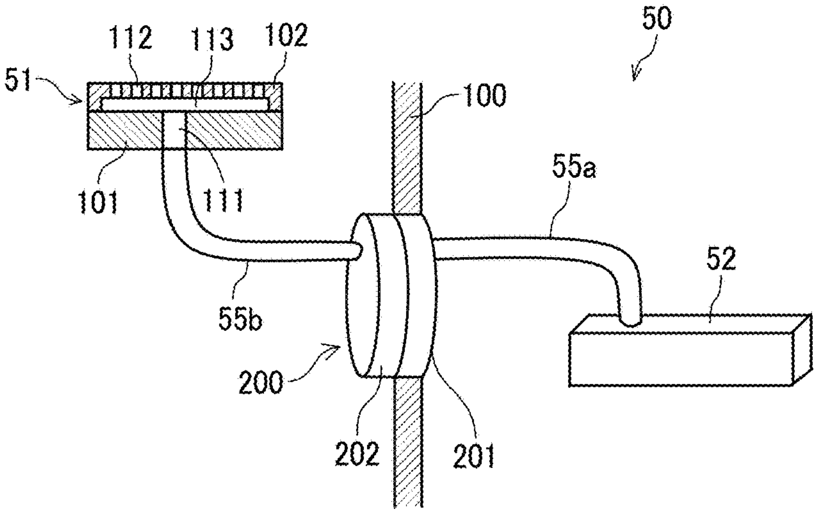
FIG. 3 is a schematic side view of an entire configuration of a sheet suction device according to the first embodiment of the present disclosure.

FIG. 3 is a schematic side view of an entire structure of a sheet suction device 50 of the printer 1.

The sheet suction device 50 includes the drum 51, the suction device 52 serving as a suction unit, and a rotary valve 200 serving as a suction region switcher. The rotary valve 200 is disposed between the drum 51 and the suction device 52. The suction device 52 and the rotary valve 200 are connected with each other via a hose 55*a* (tube), and the rotary valve 200 and the drum 51 are connected with each other via a hose 55*b* (tube). The hoses 55*a* and 55*b* are collectively referred to as a hose 55.

Next, the drum 51 according to the first embodiment is described with reference to FIGS. 4 to 8.

Figure 4:
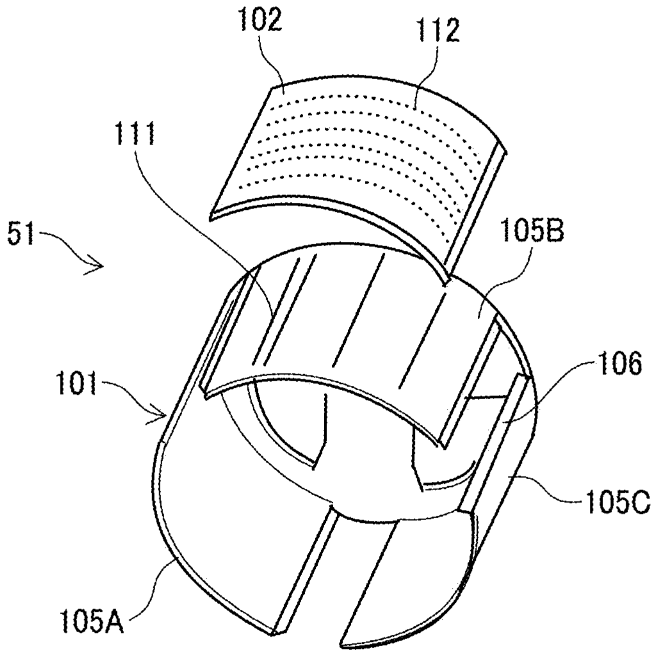
FIG. 4 is an exploded perspective view of a drum of the sheet suction device.

FIG. 4 is an exploded perspective view of the drum 51.

Figure 5:
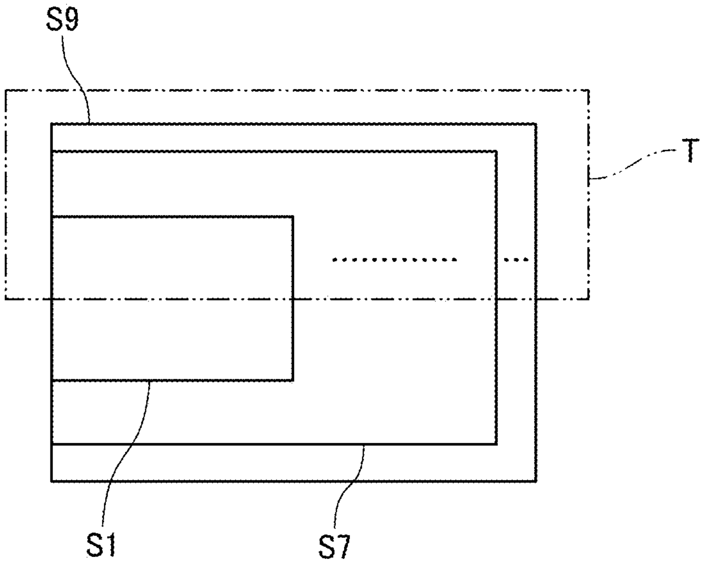
FIG. 5 is a plan view of the drum illustrating a sheet size in one bearing region of the drum.

FIG. 5 is a plan view of the drum 51 illustrating a sheet size in one bearing region 105 of the drum 51.

Figure 6:
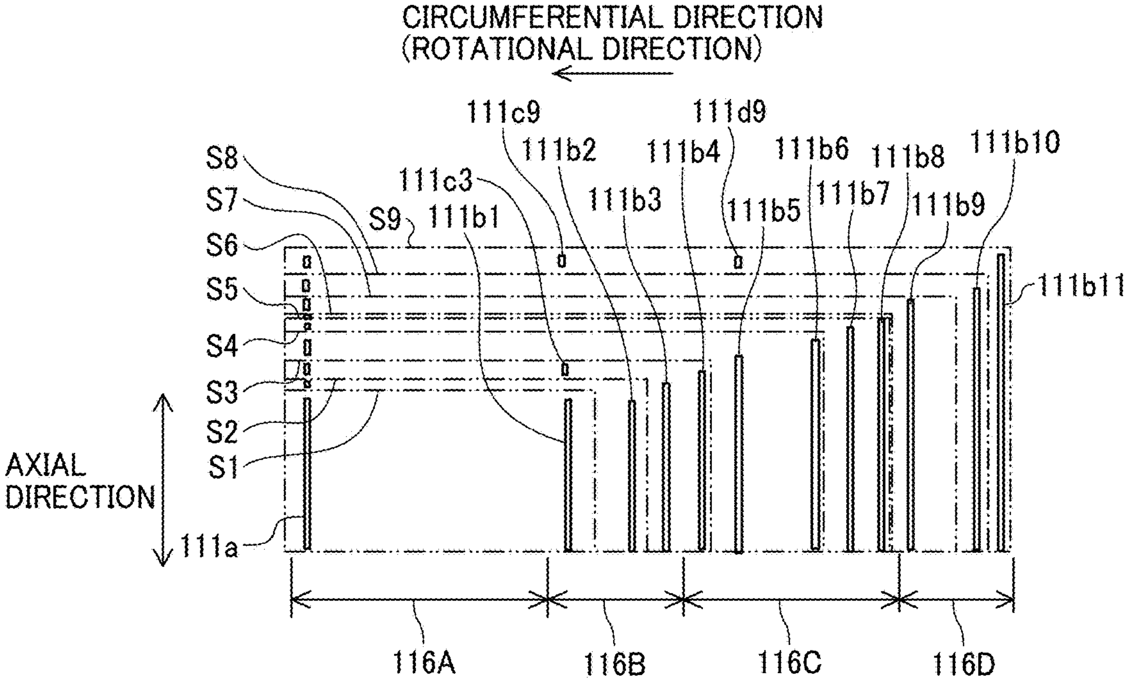
FIG. 6 is an enlarged schematic plan view of a T-portion of FIG. 5 illustrating an arrangement of suction ports and the sheet size in a circumferential direction of the drum.

FIG. 6 is an enlarged schematic plan view of a T-portion of FIG. 5 illustrating an arrangement of suction ports and the sheet size in a circumferential direction of the drum 51.

Figure 7:
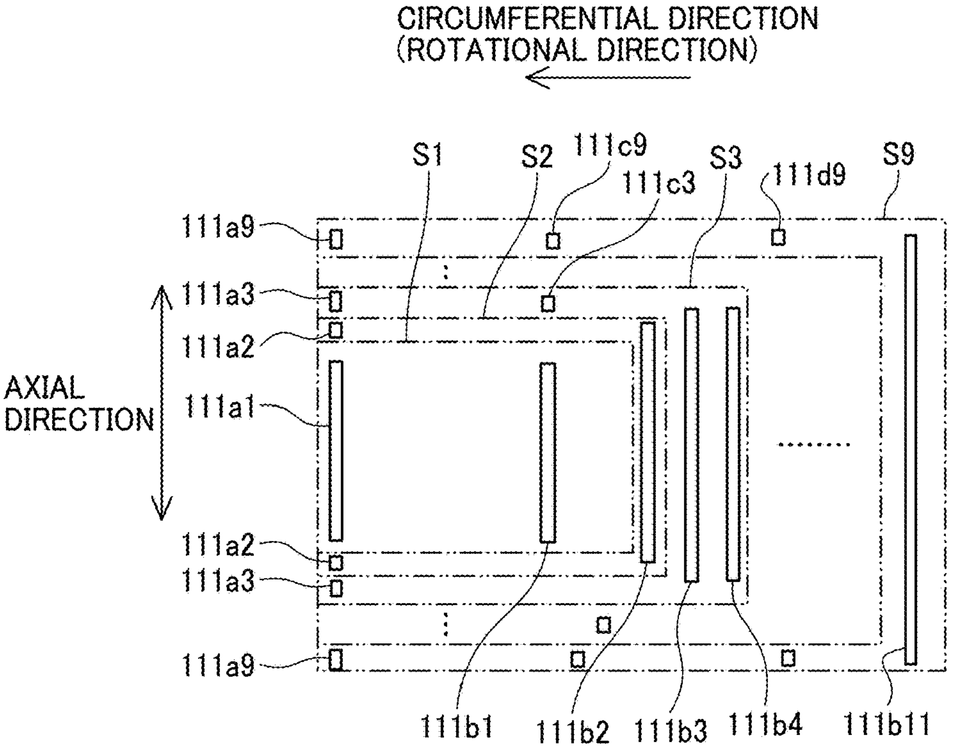
FIG. 7 is an enlarged schematic plan view of the drum illustrating an arrangement of the suction ports and the sheet size in an axial direction and the circumferential direction of the drum.

FIG. 7 is an enlarged schematic plan view of the drum 51 illustrating the arrangement of the suction ports in an axial direction and the circumferential direction of the drum 51, and the sheet size.

Figure 8:
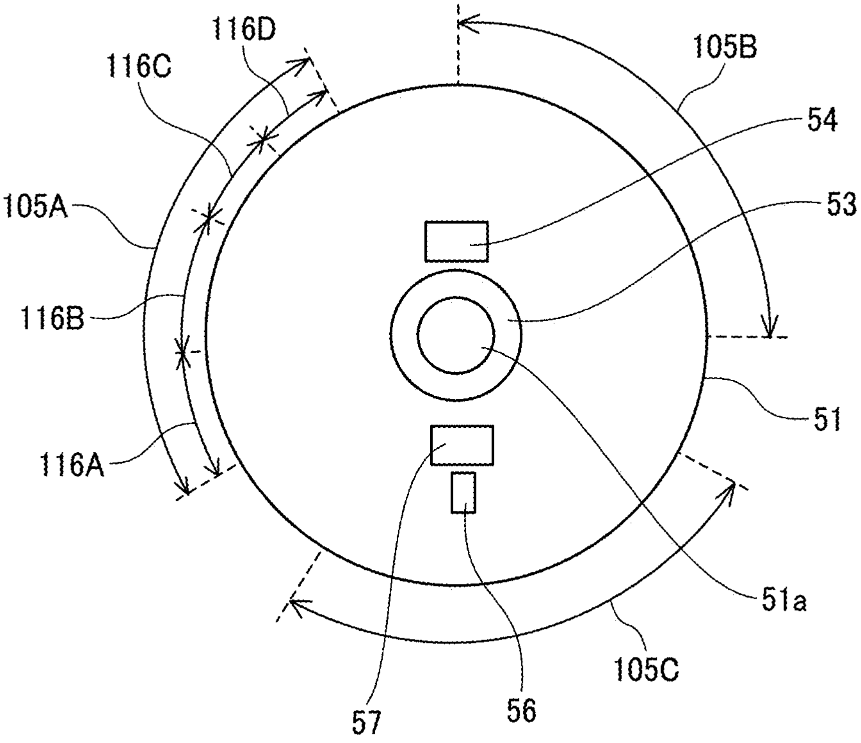
FIG. 8 is a schematic side view of the drum illustrating the bearing region and divided regions of the bearing region.

FIG. 8 is a schematic side view of the drum 51 illustrating the bearing region 105 and divided regions of the bearing region 105 of the drum 51.

The drum 51 includes a drum body 101 and a suction plate 102. A sealing material such as a rubber sheet may be interposed between the suction plate 102 and the drum body 101.

The drum 51 includes three baring regions 105 (105A to 105C) and is bearable a plurality of sheets P in the circumferential direction of the drum 51. As illustrated in FIGS. 3 and 4, the drum 51 includes three suction plates 102 for the bearing regions 105A to 105C and the drum body 101. The drum body 101 includes three bearing regions 105A to 105C. The suction plate 102 includes multiple suction holes 112 and forms a chamber 113 communicating with each of the multiple suction holes 112.

The drum body 101 includes a groove shaped suction ports 111 communicating with the chamber 113. The drum 51 includes a sheet gripper 106 at a leading end of the bearing region 105 in a rotational direction of the drum 51. The sheet gripper 106 is illustrated in a simplified manner in FIG. 4. The suction ports 111 are elongated rectangular through holes penetrating through the drum 51 (see FIG. 6). Shapes of the suction ports 111 are different according to positions of the suction ports 111 in the drum 51.

The multiple suction holes 112 are uniformly formed in the suction plate 102 (see FIG. 4), and the multiple suction ports 111 are ununiformly formed in the drum body 101 (see FIG. 6). The multiple suction ports 111 are rectangular through holes in the drum body 101 (see FIGS. 3 and 7).

As illustrated in FIGS. 5 and 6, sheet areas S1 to S9 corresponding to multiple sheet sizes (nine sheet sizes in the present embodiment) are allocated to one bearing region 105. Further, one bearing region 105 includes twelve suction ports 111*a* and 111*b*1 to 111*b*11 arranged in the circumferential direction (rotation direction) of the drum 51. As illustrated in FIG. 7, the suction port 111*a* includes suction ports 111*a*1 to 111*a*9 arranged in an axial direction (vertical direction as indicated by arrow in FIG. 7) at a leading end in the rotational direction (left end in FIG. 7) of the drum 51. The suction ports 111*a*1 to 111*a*9 respectively correspond to the sheet sizes S1 to S9.

For example, the drum 51 includes the suction ports 111*a*1 and 111*b*1 corresponding to the sheet region S1 (see FIG. 7). The suction ports 111*a*1 and 111*b*1 communicate with the chamber 113 to which the multiple suction holes 112 faces (see FIG. 7). The drum 51 includes the suction ports 111*a*2 and 111*b*2 communicating with the chamber 113 to which the multiple suction holes 112 in the sheet region S2 excluding the sheet region S1 faces (see FIG. 7). The drum 51 includes the suction ports 111*a*3, 111*b*3, and 111*b*4 communicating with the chamber 113 to which a plurality of suction holes 112 in the sheet region S3 excluding the sheet regions S1 and S2 faces (see FIG. 6). The same applies to other sheet regions S4 to S9.

Further, suction ports 111*c*3 and 111*c*9 are disposed on both outer sides of the suction port 111*b*1 (see FIG. 7) in the axial direction of the drum 51. Further, the drum 51 includes a suction port 111*d*9 on both outer sides of suction ports 111*b*5 (see FIG. 6). Here, the suction holes 112 communicating with the suction port 111*b*1 and the suction port 111*b*5 are suctions holes arranged inside in the axial direction of the drum 51 (axial direction of the bearer). The suction holes 112 leading to the suction ports 111*c*3, 111*c*9 and 111*d*9 are suction holes disposed on both outer sides of the drum 51 (see FIG. 6).

As illustrated in FIG. 8, one bearing region 105A is divided into multiple suction regions 116 including a first region 116A, a second region 116B, a third region 116C, and a fourth region 116D in the circumferential direction (rotational direction) from a leading end side in the circumferential direction (rotational direction) of the drum 51. Here, the drum 51 rotates counterclockwise as indicated by arrows in FIG. 1. The first region 116A, a second region 116B, a third region 116C, and a fourth region 116D may be collectively referred to as a "suction region 116".

Thus, the multiple suction ports 111 are divided into multiple suction regions 116 (116A, 116B, 116C, and 116D) in the circumferential direction, and the multiple suction regions 116 (116A, 116B, 116C, and 116D) includes an upstream region (fourth region 116D), a middle region (second region 116B and third region 116C), and a downstream region (first region 116A) in the circumferential direction.

As illustrated in FIG. 6, the first region 116A is allocated to the suction port 111*a* at the leading end (left end in FIG. 6) in the circumferential direction (rotation direction) of the drum 51 as indicated by arrow in FIG. 6. The circumferential direction (rotation direction) is leftward direction in FIG. 6. The second region 116B is allocated to the suction ports 111*b*1 to 111*b*3. The third region 116C is allocated to the suction ports 111*b*4 to 111*b*8. The fourth region 116D is allocated to the suction ports 111*b*9 to 111*b*11.

Thus, the sheet suction device 50 includes: a drum 51 having multiple suction ports 111 in a circumferential surface of the drum 51, the drum 51 configured to bear a sheet P on the circumferential surface and rotate in a circumferential direction of the drum 51; and a suction device 52 configured to suck the sheet P through the multiple suction ports to attract the sheet P on the circumferential surface, wherein the multiple suction ports 111 are disposed in the circumferential direction and an axial direction of the drum 51, the multiple suction ports 111 are divided into multiple suction regions 116 (116A, 116B, 116C, and 116D) in the circumferential direction, the multiple suction regions 116 (116A, 116B, 116C, and 116D) includes an upstream region (fourth region 116D), a middle region (second region 116B and third region 116C), and a downstream region (first region 116A) in the circumferential direction, and the middle region (second region 116B and third region 116C) has the multiple suction ports 111*c*3, 111*c*9, and 111*d*9 at both outer sides in the axial direction of the drum 51.

Thus, the sheet suction device 50 can connect the hose 55 (tube) to each suction port 111 (111*a* and 111*b*) on the drum 51 and switch a generation of the negative pressure to each suction port 111 (111*a* and 111*b*) to switch the suction regions.

As illustrated in FIG. 3, the rotary valve 200 includes a rotator 202 and a fixing part 201. The rotator 202 is a rotating member that rotates together with the drum 51. The fixing part 201 is coupled (connected) to the suction device 52, and the fixing part 201 does not rotate together with the drum 51. The fixing part 201 forms a switch to switch suction or non-suction (valid or invalid of suction) in the bearing region 105.

As illustrated in FIG. 8, the drum 51 includes an encoder wheel 53 that rotates in synchronization with the drum 51. The encoder wheel 53 is attached to a rotation axis 51*a* of the drum 51. The drum 51 includes a feeler 56 that rotates in synchronization with the drum 51. The feeler 56 is attached to the drum 51.

An encoder sensor 54 and a home position sensor 57 (HP sensor) are attached to the frame 100 of the printer 1. The encoder sensor 54 detects a rotation amount of the encoder wheel 53. The HP sensor 57 detects the feeler 56. The HP sensor 57 detects the feeler 56 only by one pulse (once) per one rotation of the drum 51 to detect a home position in the rotational direction of the drum 51

The encoder sensor 54 detects a rotation amount of the encoder wheel 53 to detect a relative rotation amount of the drum 51 from the home position. The printer 1 includes a controller (circuitry) that combines detection results of two sensors of the encoder sensor 54 and the HP sensor 57 to detect an absolute phase (rotational phase) of the drum 51 and the rotator 202 of the rotary valve 200 that rotates together with the drum 51.

Thus, the controller (circuitry) of the printer 1 switches a connection (communication) and a disconnection (noncommunication) between the suction hole 112 and the suction device 52 according to a relative phase difference between the rotator 202 and the fixing part 201 to control timing of generation of the negative pressure on the circumferential surface of the drum 51 (see FIG. 3). The relative phase difference between the rotator 202 and the fixing part 201 is calculated from the detection results of two sensors of the encoder sensor 54 and the HP sensor 57. Generally, a metal plate processed into a disk shape is used for both the rotator 202 and the fixing part 201.

FIGS. 9 to 15 illustrates the rotary valve 200 according to the first embodiment of the present disclosure.

Figure 9:
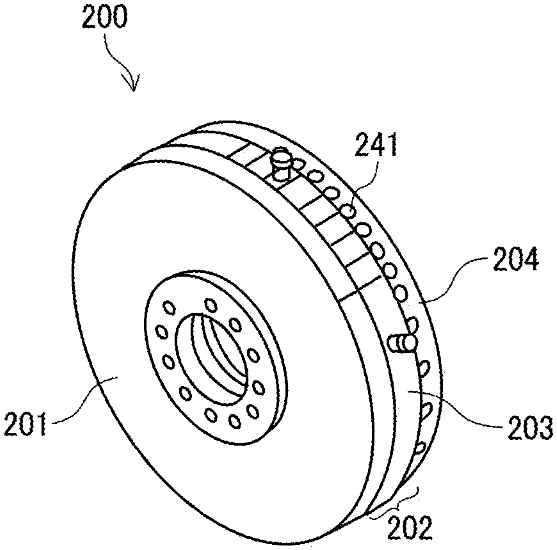
FIG. 9 is an external perspective view of a rotary valve according to a first embodiment of the present disclosure.

FIG. 9 is a schematic external perspective view of the rotary valve 200.

Figure 10:
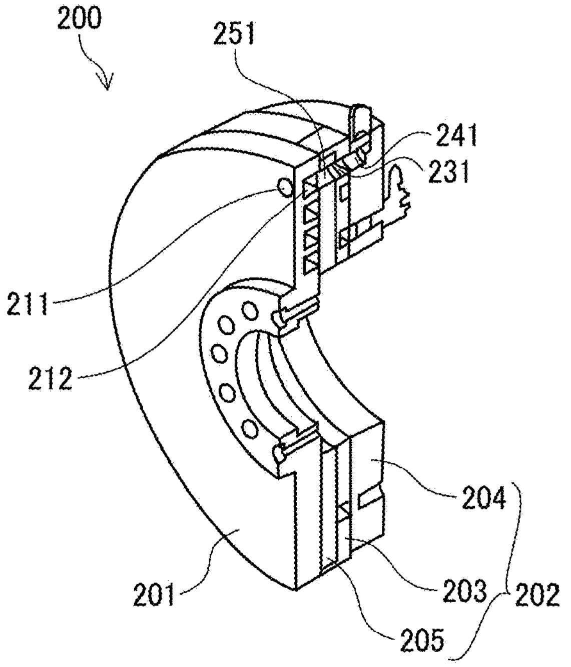
FIG. 10 is a schematic cross-sectional perspective view of the rotary valve cut in half.

FIG. 10 is a schematic cross-sectional perspective view of the rotary valve 200 cut in half.

Figure 11:
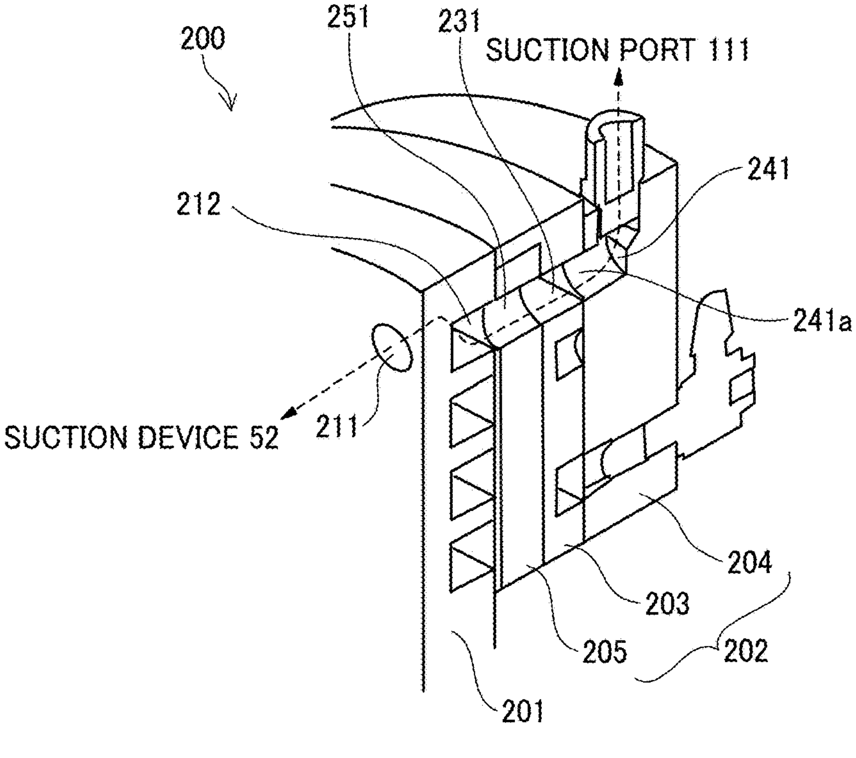
FIG. 11 is a schematic enlarged cross-sectional perspective view of a main part of the rotary valve cut in half.

FIG. 11 is a schematic enlarged cross-sectional perspective view of a main part of the rotary valve 200 cut in half.

Figure 12A:
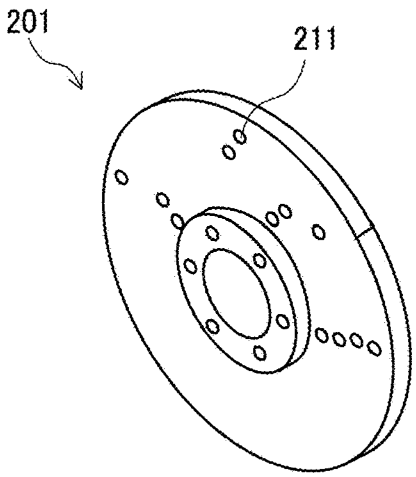
FIGS. 12A and 12B are schematic perspective views of the fixing part that configures the rotary valve.
Figure 12B:
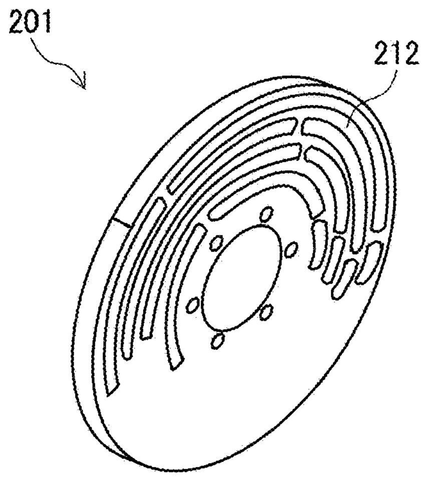

FIGS. 12A and 12B are schematic perspective views of the fixing part 201 that forms the rotary valve 200.

Figure 13:
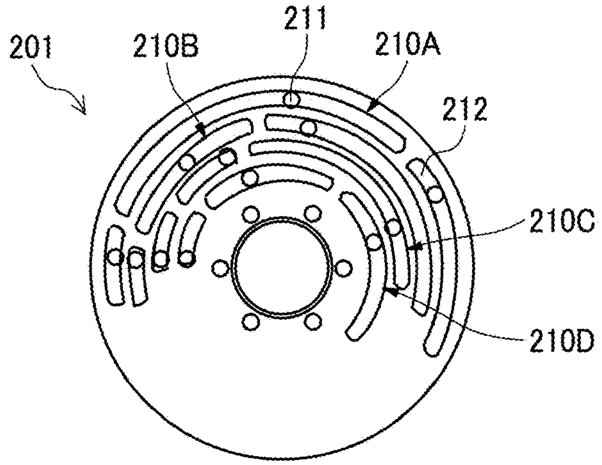
FIG. 13 is a schematic side view of the fixing part.

FIG. 13 is a schematic side view of the fixing part 201.

Figure 14A:
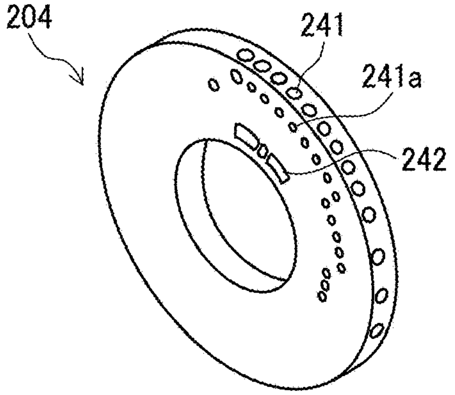
FIGS. 14A and 14B are schematic perspective views of a second member that configures the rotary valve.
Figure 14B:
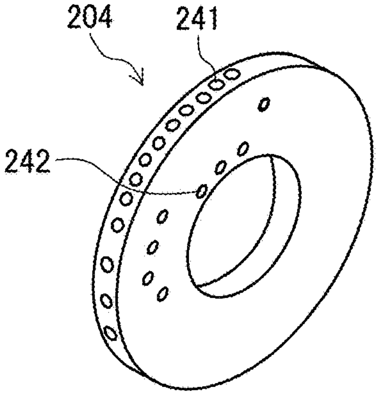

FIGS. 14A and 14B are schematic perspective views of a second member 204 that forms the rotary valve 200.

Figure 15:
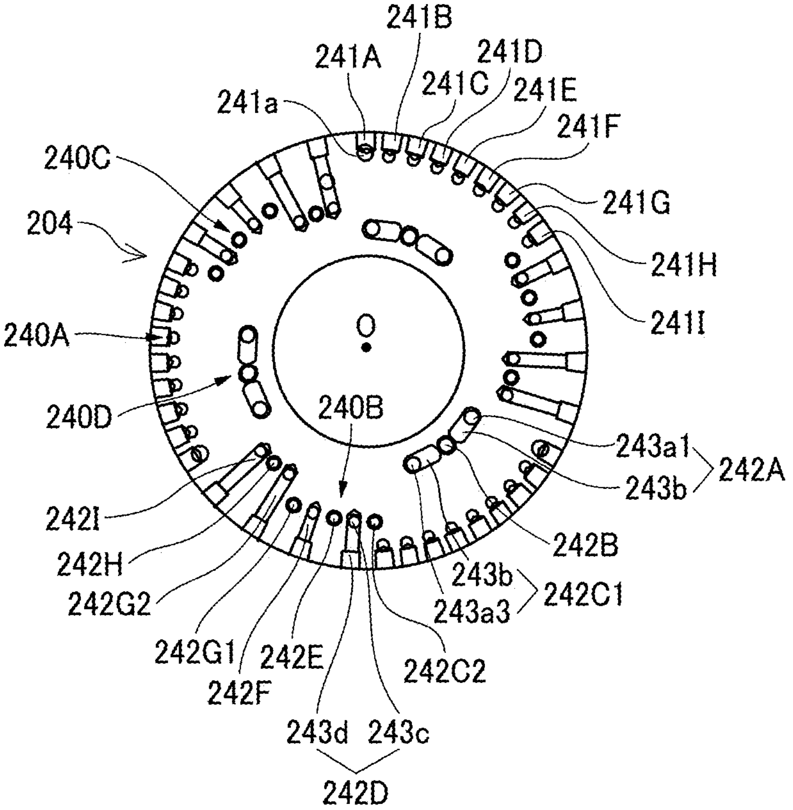
FIG. 15 is a schematic side view of the second member.

FIG. 15 is a schematic side view of the second member 204.

Figure 16A:
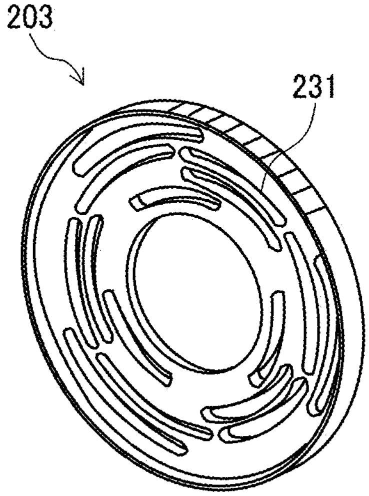
FIGS. 16A and 16B are schematic perspective views of a first member that configures the rotary valve.
Figure 16B:
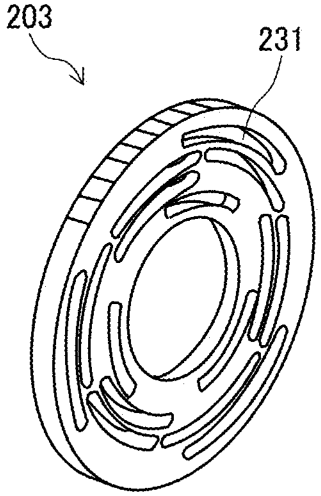

FIGS. 16A and 16B are schematic perspective views of a first member 203 that forms the rotary valve 200.

Figure 17:
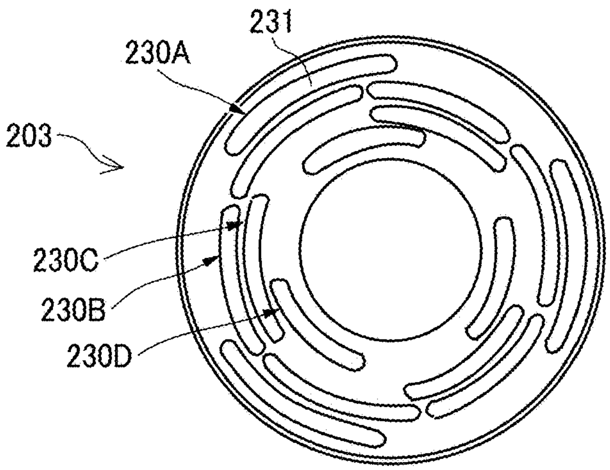
FIG. 17 is a schematic side view of the first member.

FIG. 17 is a schematic side view of the first member 203.

Figure 18A:
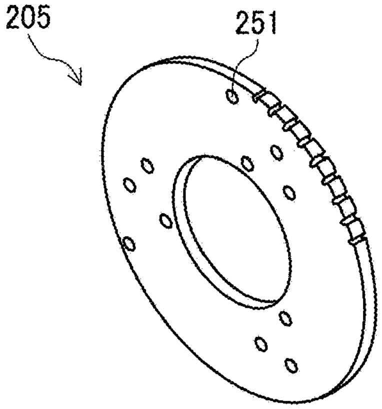
FIGS. 18A and 18B are schematic perspective views of a third member that configures the rotary valve.
Figure 18B:
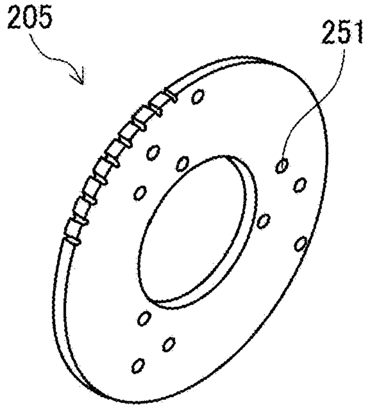

FIGS. 18A and 18B are schematic perspective views of a third member 205 that forms the rotary valve 200.

Figure 19:
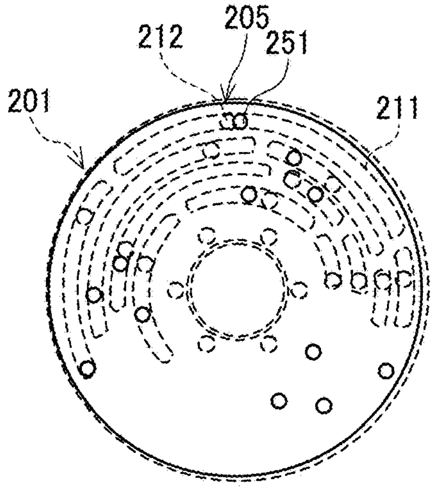
FIG. 19 is a schematic side view of the third member overlaid on the fixing part.

FIG. 19 is a schematic side view of the third member 205 superposed on the fixing part 201.

As illustrated in FIG. 3, the rotary valve 200 includes the fixing part 201 fixed to the frame 100 of the printer 1. The frame 100 supports the drum 51, the transfer cylinder 24, the discharge unit 23, and the like. The fixing part 201, the HP sensor 57, and the encoder sensor 54 may be fixed to multiple divided frames or multiple divided brackets.

The fixing part 201 includes rows of multiple grooves 212 arranged in a radial direction and divided into three parts in the circumferential direction of the fixing part 201 (see FIGS. 12B and 13). Each groove 212 includes grooves 211 to be coupled to the suction device 52 (see FIGS. 12A and 13). Rows of the multiple grooves 212 located on the same concentric circle are referred to as a groove row 210A, a groove row 210B, a groove row 210C, and a groove row 210D, respectively as illustrated in FIG. 13. The groove rows 210A, 210B, 210C, and 210D are collectively referred to as a "groove row 210".

The rotator 202 of the rotary valve 200 includes a first member 203, a second member 204, and a third member 205 (see FIG. 11). The first member 203, the second member 204, and the third member 205 are arranged in an order of the third member 205, the first member 203, and the second member 204 from the fixing part 201 as illustrated in FIGS. 10 and 11. The first member 203 has a shape covering the outer peripheral surface of the third member 205 in a radial direction of the rotary valve 200 (see FIG. 11). The third member 205 is fitted into the first member 203.

As illustrated in FIGS. 14A and 14B, and FIG. 15, the second member 204 is a disk-shaped member including a plurality of (here, nine) holes 241 (241A to 241I) communicating with the suction port 111 of the drum 51 on a circumferential surface of the second member 204 (disk-shaped member). Each holes 241 (241A to 241I) includes an opening 241*a* on a side surface of the second member 204. The side surface of the second member 204 contacts with the first member 203. The nine holes 241A to 241I (see FIG. 15) arranged in the circumferential direction are communicable with the nine suction ports 111*a* (111*a*1 to 111*a*9) arranged in the axial direction of the drum 51 and are connectable to corresponding one of the plurality of suction holes 112.

Further, the second member 204 includes multiple types of multiple holes 242 (242A to 242I) on a side surface of the second member 204 (disk-shaped member) or the like (see FIG. 15).

As illustrated in FIG. 15, the holes 242A and 242C1 respectively include a through hole 243*a*1 and 243*a*3 that penetrates through the second member 204 in the axial direction and grooves 243*b* extending in the circumferential direction (rotation direction) of the second member 204. The grooves 243*b* respectively communicate with the through holes 243*a*1 and 243*a*3.

Each of the holes 242B, 242C2, 242E, 242G1, and 242H includes a through hole 243*a*1 that penetrates the second member 204 in the axial direction. Each of the holes 242D, 242F, 242G2, and 242I includes a non-through hole 243*c* and a hole 243*d*. The non-through hole 243*c* does not penetrate through the second member 204 in the axial direction of the second member 204. The hole 243*d* extends in the radial direction of the second member 204 from the non-through hole 243*c*. The holes 242 (242A to 242I) as described above also communicates with the suction ports 111.

As illustrated in FIG. 15, the multiple holes 241, for example, are provided corresponding to the respective bearing regions 105A, 105B, and 105C. However, the holes 241 for one bearing region 105, for example, are simply illustrated in FIG. 14.

As illustrated in FIGS. 16A and 16B, the first member 203 is a disk-shaped member that includes through grooves 231 along a circumferential direction on a side surface of the first member 203 (disk-shaped member). The through grooves 231 are provided for each of the bearing regions 105 (105A, 105B, and 105C, see FIGS. 4 and 8). As illustrated in FIG. 17, the first member 203 includes the through grooves 231 (230A, 230B, 230C, and 230D) at four positions that are concentric in the radial direction from the outer circumferential side toward the center of the first member 203. Each row of the through grooves 231 positioned at the same concentric circle is collectively referred to as groove rows 230A, 230B, 230C, and 230D, respectively.

With reference again to FIG. 15, rows of the holes 241 and 242 of the second member 204 corresponding to the groove rows 230A to 230D of the first member 203 (see FIG. 17) are respectively referred to as hole rows 240 (240A to 240D) from the outer circumference side toward the center of the second member 204. Each of the rows of the holes 241 and 242 is arranged in the circumferential direction of the second member 204.

The second member 204 includes the holes 242C1 and 242C2 (see FIG. 15). The holes 242C1 and 242C2 are two or more holes 242 that are simultaneously and respectively communicate with the groove row 230D and the groove row 230B (see FIG. 17) of the grooves 231 of the first member 203 by a rotation of the first member 203 for a unit rotation amount. The hole 242C1 belongs to the hole row 240D, and the hole 242C2 belongs to the hole row 240B of the second member 204 (see FIG. 15).

Thus, the holes 242C1 and 242C2 (see FIG. 15) are two or more holes 242 that simultaneously communicate with the groove row 230D and the groove row 230B (see FIG. 17) of the groove 231 of the first member 203, respectively. The holes 242C1 and 242C2 are disposed at different distances from a rotation center "O" of the second member 204 (see FIG. 15). In other words, the two holes 242C1 and 242C2 simultaneously communicate with the groove row 230D and the groove row 230B, respectively. The two holes 242C1 and 242C2 respectively belong to the different hole rows 240D and 240B among the multiple hole rows 240 arranged in the radial direction of the second member 204.

Similarly, the second member 204 includes the hole 242G1 and 242G2. (see FIG. 15). The hole 242G1 belongs to the hole row 240B, and the hole 242G2 belongs to the hole row 240C of the second member 204. The holes 242G1 and 242G2 are two or more holes 242 that simultaneously communicate with the groove row 230B and the groove row 230C of the grooves 231 of the first member 203 (see FIG. 17), respectively, by the rotation of first member 203 for the unit rotation amount.

Thus, the holes 242G1 and 242G2 are the two or more holes 242 that simultaneously communicate with the groove row 230B and the groove row 230C of the grooves 231 of the first member 203 (see FIG. 17), respectively. The holes 242G1 and 242G2 are disposed at different distances from the rotation center "O" of the second member 204. In other words, the two holes 242G1 and 242G2 simultaneously communicate with the groove row 230B and the groove row 230C of the first member 203, respectively. The two holes 242G1 and 242G2 respectively belong to the different hole rows 240B and 240C among the multiple hole rows 240 arranged in the radial direction of the second member 204.

Thus, the second member 204 includes the two holes 242C1 and 242C2 or the two holes 242G1 and 242G2 that simultaneously communicate with the groove row 230B and the groove row 230C of the first member 203, respectively, by the rotation of the first member 203 for the unit rotation amount. Thus, the rotary valve 200 can selects one of the two holes 242C1 and 242C2 or selects one of the two holes 242G1 and 242G2 according to a size of the sheet P to be used.

Thus, a switch (rotary valve 200) is configured to switch the multiple suction regions (116A, 116B, 116C, and 116D) to be sucked according to a size of the sheet P.

The rotary valve 200 closes one of unselected two holes 242C1 and 242C2 or closes one of unselected two holes 242G1 and 242G2 by a plug. Thus, the rotary valve 200 can easily change the suction region according to a type of a size of the sheet P (destination of the sheet P).

The third member 205 (see FIGS. 18A and 18B) having a disk shape includes a through hole 251 through which the grooves 212 of the fixing part 201 and the grooves 231 of the first member 203 communicate with each other (see FIG. 11).

The first member 203, the second member 204, and the third member 205 form the rotator 202 (see FIG. 11). The first member 203, the second member 204, and the third member 205 rotate along with a rotation of the drum 51 when the sheet P is conveyed.

When the rotary valve 200 changes (switches) the suction region 116 (suction area), the rotary valve 200 rotates the first member 203 relative to the second member 204 and the third member 205. The third member 205 rotates together with the first member 203. Rotation of the first member 203 changes a number of holes 242 of the second member 204 communicating with the grooves 231 of the first member 203. Thus, a connection status of a suction channel in the rotary valve 200 changes. Thus, the rotary valve 200 can change (switch) the suction region 116 (suction area) according to the size of the sheet P (destination of the sheet P).

Thus, the sheet suction device 50 includes a switch (rotary valve 200) configured to switch the multiple suction regions 116 (116A, 116B, 116C, and 116D), wherein the switch (rotary valve 200) switches the multiple suction regions 116 (116A, 116B, 116C, and 116D) according to a size of the sheet P.

Next, an allocation of the bearing regions 105 and the grooves 231 is described with reference to FIG. 20.

Figure 20:
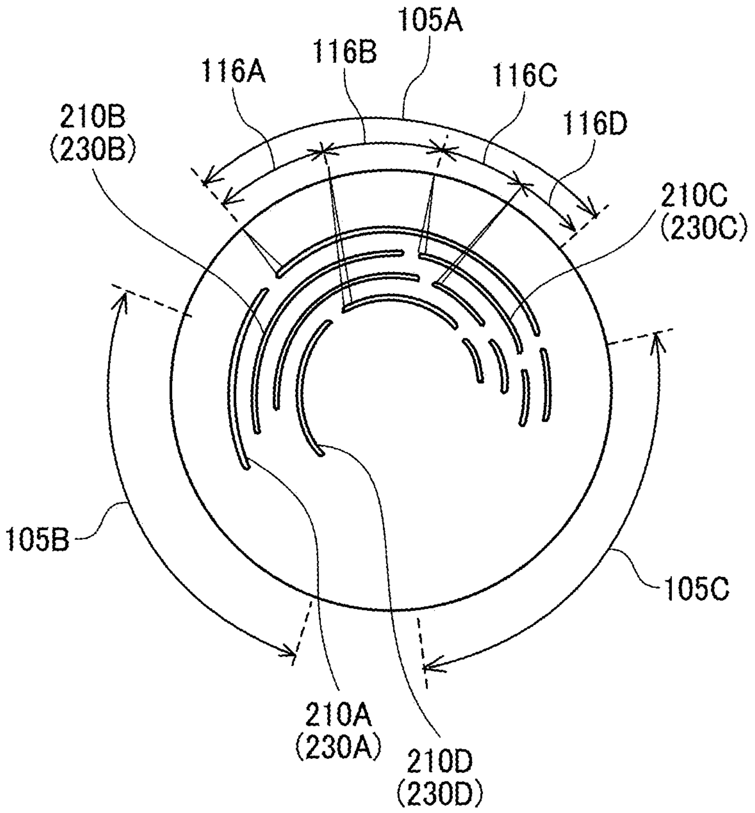
FIG. 20 is a schematic side view of the drum illustrating an allocation of the bearing region and grooves of the fixing part.

FIG. 20 is a side view of the drum 51 illustrating the allocation of the bearing regions 105 and the grooves 231.

As described above, the circumferential surface of the drum 51 is divided into three bearing regions 105 (105A to 105C). One bearing region 105 is divided into four regions of the first region 116A to the fourth region 116D.

The outermost groove row 210A of the fixing part 201 is allocated to the first region 116A. The groove row 230A of the first member 203 switches between communication and noncommunication of each suction port 111 of the first region 116A with the suction device 52. That is, the groove row 230A connects and disconnects each suction port 111 of the first region 116A with the suction device 52.

Further, the groove row 210D is allocated to the second region 116B. The groove row 230D of the first member 203 switches between communication and noncommunication of each suction port 111 of the second region 116B with the suction device 52. That is, the groove row 230D connects and disconnects each suction port 111 of the second region 116B with the suction device 52. Similarly, the groove row 210B of the fixing part 201 is allocated to the third region 116C. The groove row 230B of the first member 203 switches between communication and noncommunication of each suction port 111 of the third region 116C with the suction device 52.

That is, the groove row 230B connects and disconnects each suction port 111 of the third region 116C with the suction device 52. Similarly, the groove row 210C of the fixing part 201 is allocated to the fourth region 116D. The groove row 230C of the first member 203 switches between communication and noncommunication of each suction port 111 of the fourth region 116D with the suction device 52. That is, the groove row 230C connects and disconnects each suction port 111 of the fourth region 116D with the suction device 52.

Here, the sheet suction device 50 sucks the first region 116A, the second region 116B, the third region 116C and the fourth region 116D in this order from the downstream side to the upstream side in the circumferential direction.

Next, a switching operation (size switching operation) of the suction regions (suction areas) by relative rotation of the first member 203 and the second member 204 is described below with reference to FIGS. 21(*a*) to 21(*c*) and FIGS. 22(*a*) to 22(*c*).

Figure 21:
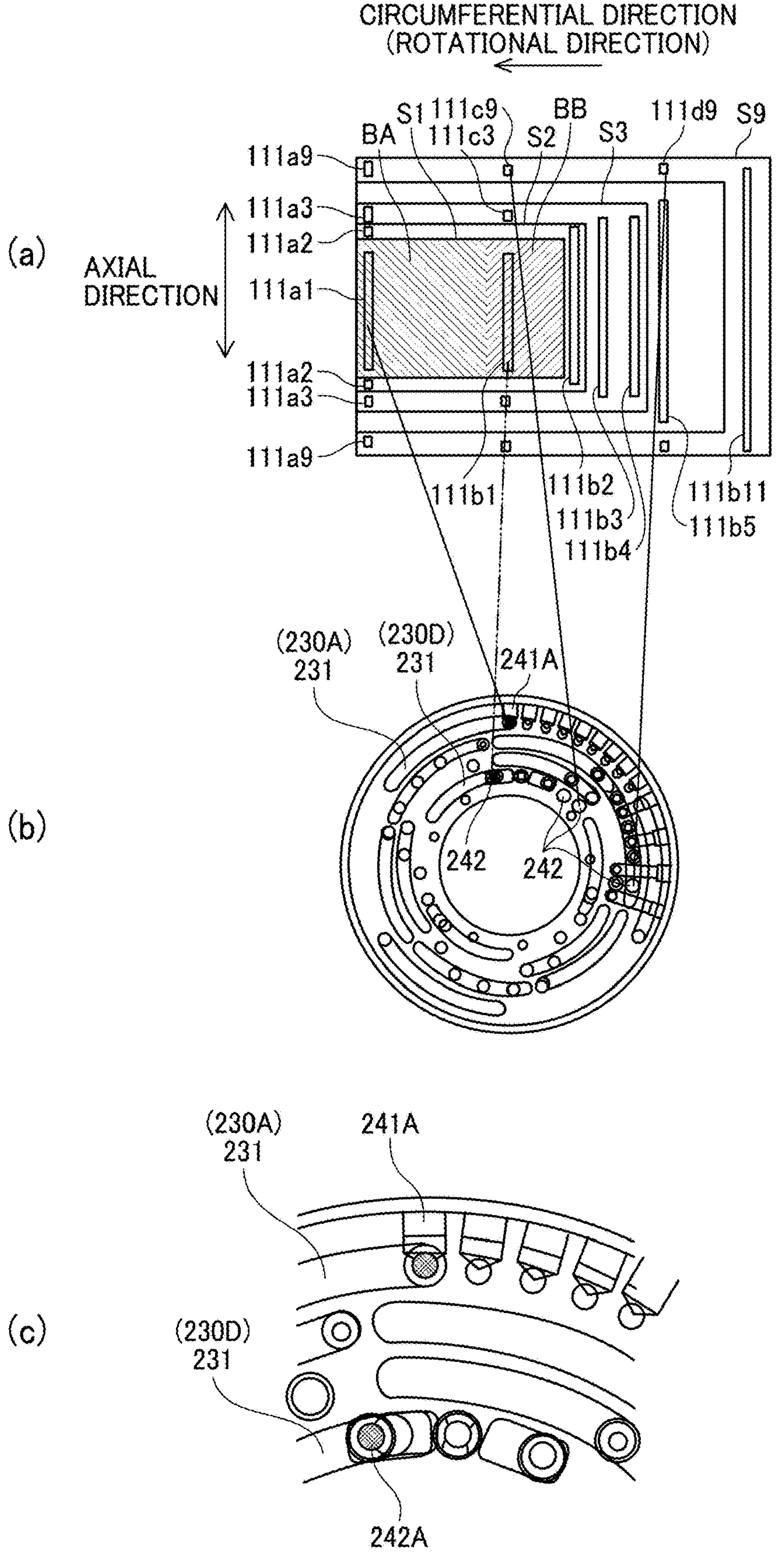
FIGS. 21(*a*) to 21(*c*) are schematic plan view and side views of the rotary valve illustrating changing of suction regions (size changing) by relative rotation of the first member and the second member.
Figure 22:
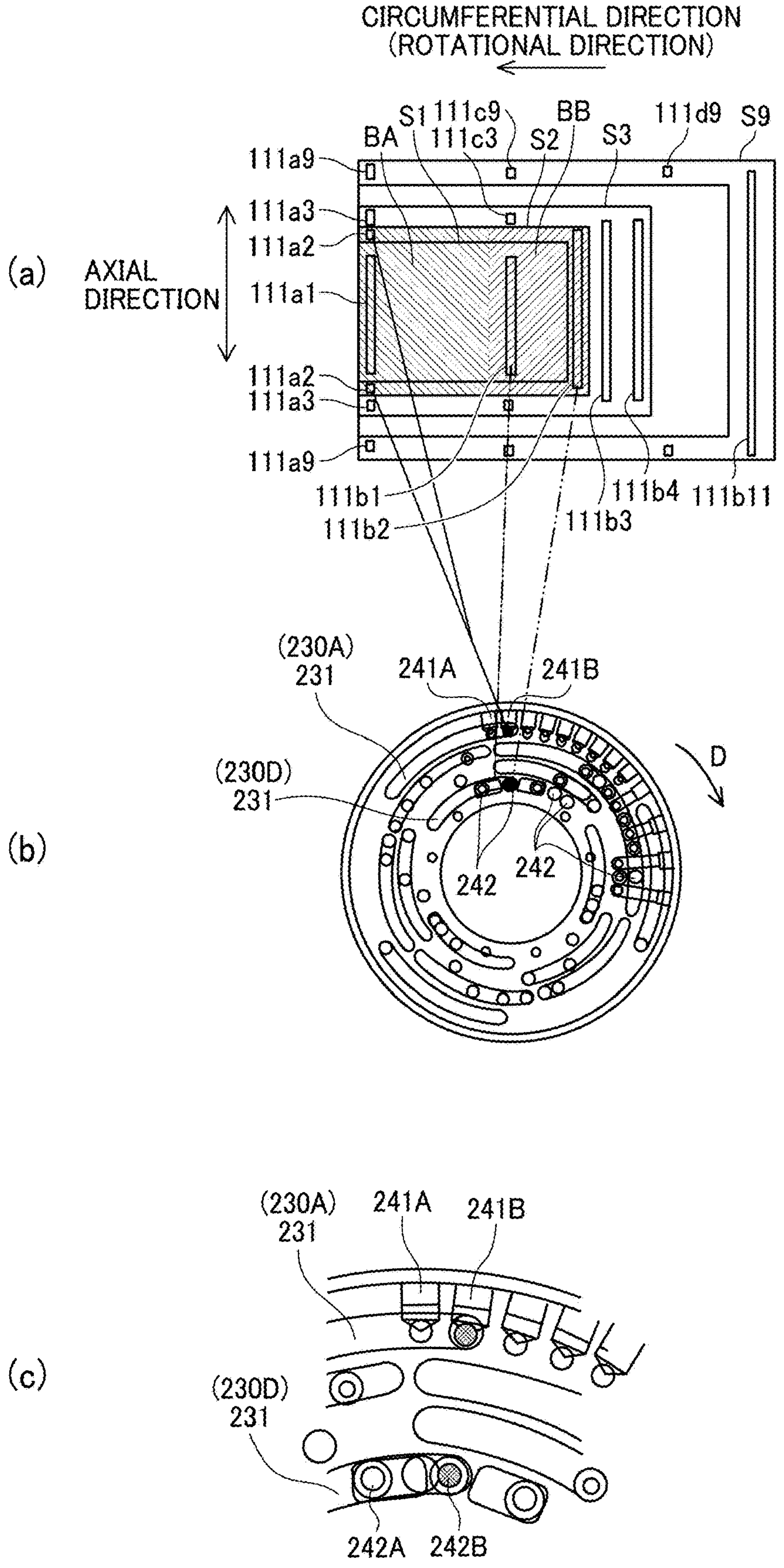
FIGS. 22(*a*) to 22(*c*) are schematic plan view and side views of the rotary valve illustrating changing of the suction regions (size changing)

FIGS. 21(*a*) to 21(*c*) and FIGS. 22(*a*) to 22(*c*) illustrate the switching operation (size switching operation) of the suction regions (suction areas) by the relative rotation of the first member 203 and the second member 204.

FIGS. 21(*a*) and 22(*a*) are schematic plan views of the drum 51 illustrating the size of the sheet P and the suction ports 111 on the drum 51.

FIGS. 21(*b*) and 22(*b*) are schematic transparent side views of the first member 203 and the second member 204.

FIGS. 21(*c*) and 22(*c*) are enlarged transparent side views of the first member 203 and the second member 204 in FIGS. 21(*b*) and 22(*b*).

As described above, the nine holes 241A to 241I (see FIG. 15) in the circumferential direction of the second member 204 communicate with the nine suction ports 111*a* (111*a*1 to 111*a*9) of the drum 51.

Therefore, a number of holes 242 of the second member 204 (number of suction ports 111*a* of the drum 51) communicating with the groove 231 of the groove row 230A of the first member 203 is switched (changed) to switch (change) the size of the suction region 116 (suction area) in the axial direction of the drum 51. The axial direction of the drum 51 is orthogonal to the circumferential direction of the drum 51 (see FIGS. 21(*a*) and 22(*a*)).

That is, the number of holes 242 of the second member 204 (number of suction ports 111*a* of the drum 51) communicating with the grooves 231 of the first member 203 is switched (changed) to switch (change) the number of the suction holes 112 facing the chamber 113 with which the suction ports 111*a* of the drum 51 communicate.

The holes 242 of the second member 204 (suction ports 111*b* (111*b*1 to 111*b*11) of the drum 51) communicate with any one of the groove rows 230B to 230D of the first member 203.

Therefore, the number of suction ports 111*b* (111*b*1 to 111*b*11) of the drum 51 communicating with the groove 231 of the groove rows 230B to 230D of the first member 203 via the holes 242 of the second member 204 is switched (changed) to switch (change) the size of the suction region (suction area) in the circumferential direction of the drum 51.

The number of suction ports 111*b* of the drum 51 (number of holes 242 of the second member 204) communicating with the grooves 231 of the first member 203 is switched (changed) to switch (change) the number of the suction holes 112 facing the chamber 113 with which the suction ports 111*b* of the drum 51 communicate.

For example, as illustrated in FIGS. 21(*b*) and 21(*c*), the relative positional relation between the first member 203 and the second member 204 is set to a state in which the groove 231 of the groove row 230A of the first member 203 communicates with the hole 241A of the second member 204, and the groove 231 of the groove row 230D of the first member 203 communicates with the hole 242 of the second member 204.

Thus, the suction device 52 communicates with the suction port 111*a*1 of the drum 51. Further, the suction device 52 communicates with the suction ports 111*b*1 of the drum 51.

Thus, as illustrated in FIG. 21(*a*), the suction device 52 sucks air through the suction holes 112 (see FIGS. 3 and 4) belonging to a region BA communicating with the suction port 111*a*1 and a region BB communicating with the suction port 111*b*1 so that the suction device 52 can suck the air in the suction region of the sheet region S1.

From the state in FIG. 21(*a*), the first member 203 is rotated relative to the second member 204 in a direction indicated by arrow "D" illustrated in FIGS. 22(*b*) and 22(*c*) so that the relative positional relation between the first member 203 and the second member 204 becomes a state in which the groove 231 of the groove row 230A of the first member 203 communicates with the two holes 241A and 241B of the second member 204, and the groove 231 of the groove row 230D of the first member 203 communicates with the two holes 242A and 242B of the second member 204 (see FIG. 22(*c*)).

Note that shaded circles in FIGS. 22(*b*) and 22(*c*) indicate the holes 241 and 242 (i.e. the hole 241B and 242B) that are new holes 241 and 242 of the second member 204 communicating with the groove 231 of the first member 203.

Then, the suction device 52 communicates with the suction ports 111*a*1 and 111*a*2 of the drum 51. Further, the suction device 52 communicates with the suction ports 111*b*1 and 111*b*2 of the drum 51.

Thus, as illustrated in FIG. 22(*a*), the suction device 52 sucks air through the suction holes 112 belonging to a region BA communicating with the suction ports 111*a*1 and 111*a*2 and a region BB communicating with the suction ports 111*b*1 and 111*b*2 so that the suction device 52 can suck the air in the suction region 116 of the sheet region S2 having an area larger than the sheet region S1.

FIGS. 23A to 23C, FIGS. 24A to 24C, and FIGS. 25A to 25C illustrate transition of the relative positions between the first member 203 and the second member 204 when the first member 203 is rotated to change the relative positions with the second member 204 in nine rotation steps (nine rotation phases) in the above-described configuration of the rotary valve 200.

Figure 23C:
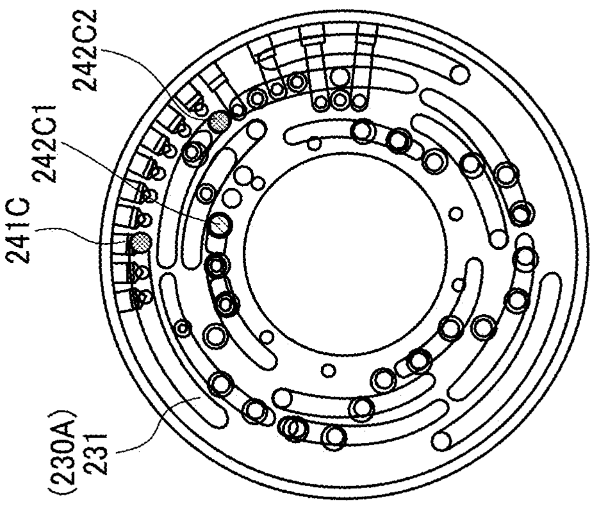
FIGS. 23A to 23C are schematic transparent side views of the first member and the second member in a transition state of a relative positions between the first member and the second member when the relative positions is changed in nine steps.
Figure 23B:
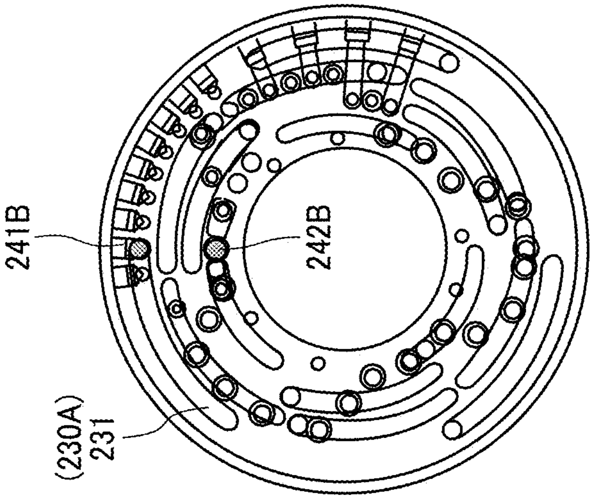
Figure 23A:
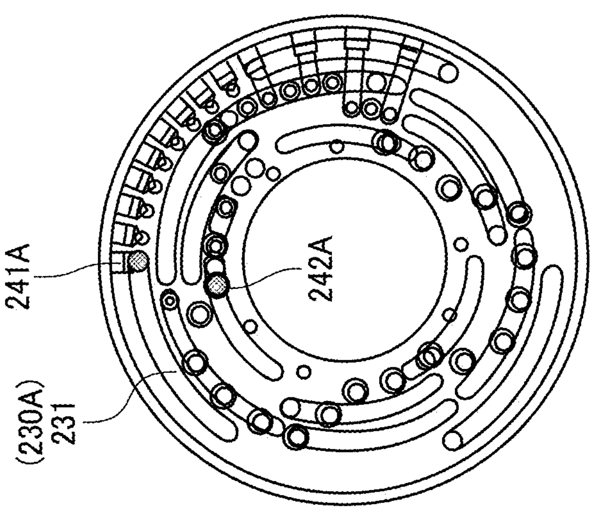
Figure 24A:
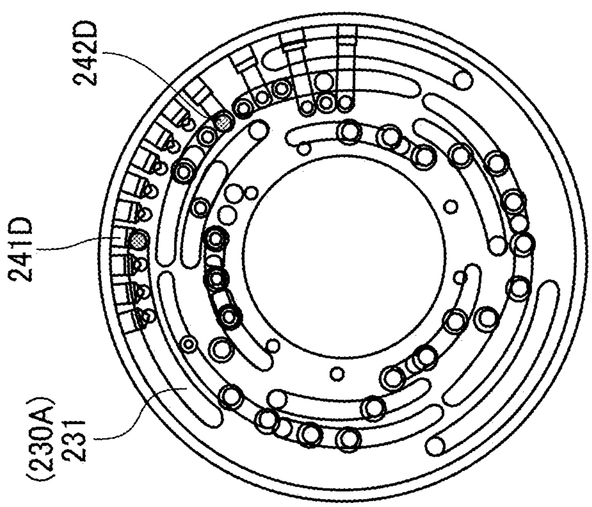
FIGS. 24A to 24C are schematic transparent side views of the first member and the second member illustrating the transition state following the transition state in FIG. 23A to 23C.
Figure 24B:
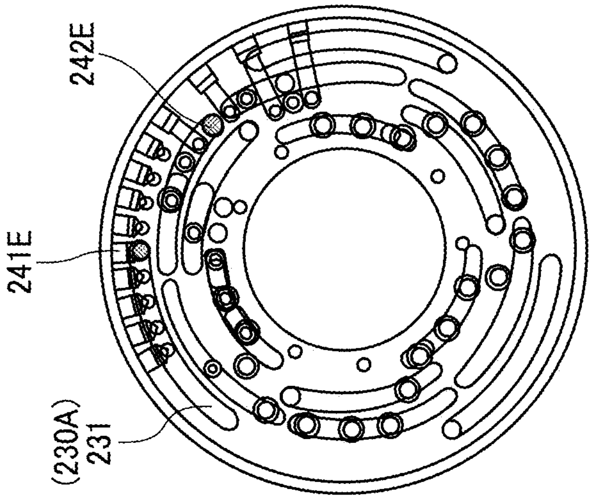
Figure 24C:
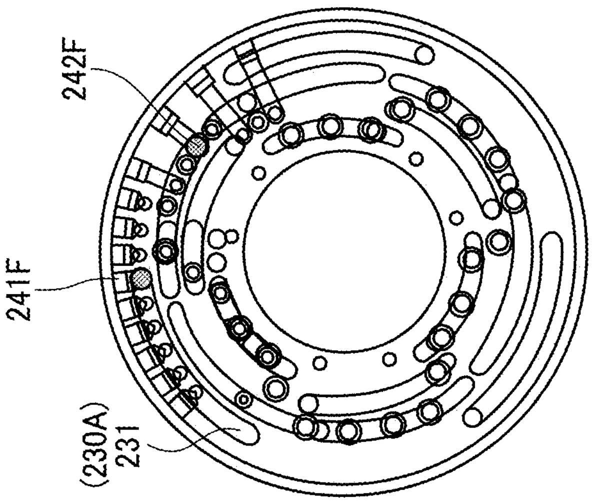
Figure 25A:
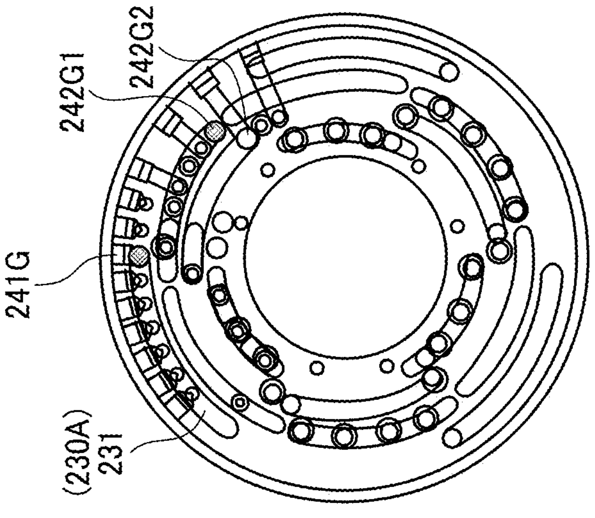
FIGS. 25A to 25C are schematic transparent side views of the first member and the second member illustrating the transition state following the transition state in FIG. 24A to 24C.
Figure 25B:
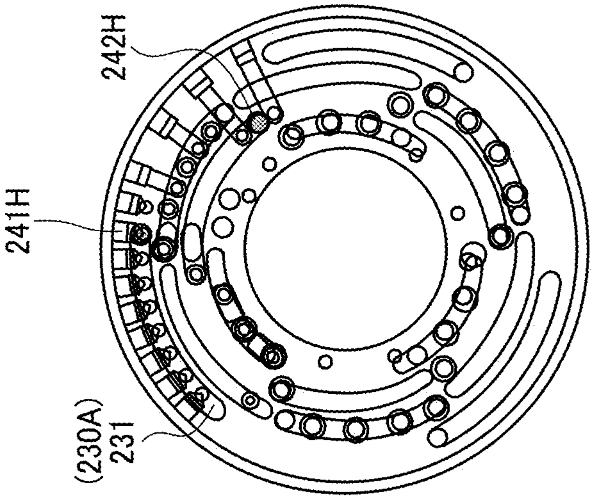
Figure 25C:
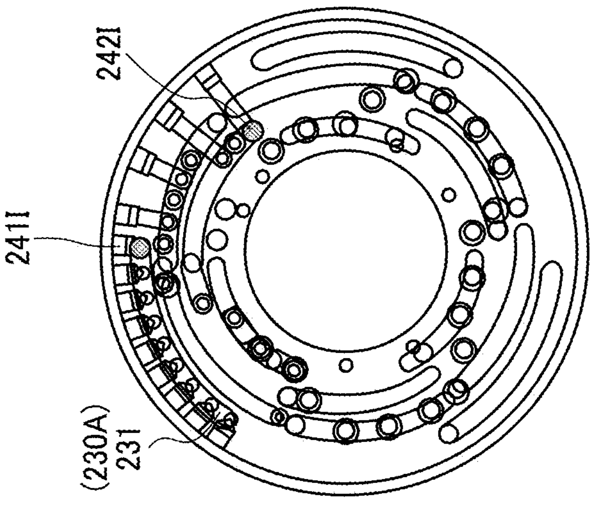

FIGS. 23A to 23C, FIGS. 24A to 24C, and FIGS. 25A to 25C are schematic transparent side views of the first member 203 and the second member 204. Note that FIG. 23A is the same position as FIG. 21B, and FIG. 23B is the same position as FIG. 22B.

The holes 241 and 242 of the second member 204 are arranged so that the two or three holes 241 and 242 communicate with one of the bearing regions 105 of the drum 51 for each time the relative position is switched (changed) by one rotation step (one rotation phase). The rotary valve 200 according to the first embodiment includes the drum 51 having three bearing regions 105 (105A to 105C, see FIG. 4). Thus, a number of the holes 241 and 242 of the second member 204 communicate with the bearing regions 105 by one rotation step (one rotation phase) of the first member 203 becomes six or nine.

The number of holes 241 and 242 are set to two or three for one rotation step (one rotation phase) so that the sheet suction device 50 can select the suction regions (suction areas) according to the destination of the sheet P. For example, three suction ports 111*b* of the drum 51 may be allocated to an innermost groove row 230D of the first member 203 via the holes 242 of the second member 204, and five suction ports 111*b* of the drum 51 may be allocated to the groove row 230C of the first member 203 via the holes 242 of the second member 204. Alternatively, two suction ports 111*b* of the drum 51 may be allocated to the innermost groove row 230D of the first member 203 via the holes 242 of the second member 204, and five suction ports 111*b* of the drum 51 may be allocated to the groove row 230C of the first member 203 via the holes 242 of the second member 204.

In the present embodiment, illustrated in FIG. 21(*a*), the drum 51 has suction ports 111*c*3, 111*c*9, and 111*d*9 on both outer sides of the drum 51 in the axial direction of the drum 51. The suction ports 111*c*3, 111*c*9, and 111*d*9 are substantially aligned with the corresponding suction ports 111*b*1, 111*b*1, and 111*b*5, respectively.

Thus, the suction ports 111*c*3, 111*c*9, and 111*d*9 in the middle region (second region 116B and third region 116C) are respectively aligned in the axial direction of the drum 51. That is, the multiple suction ports 111*c*3 and 111*c*9 at said both outer sides in the middle region (second region 116B and third region 116C) are aligned in the circumferential direction of the drum 51.

On the other hand, the second member 204 of the rotary valve 200 has holes 242 communicating with the suction ports 111*c*3, 111*c*9, and 111*d*9 for the same reason that the drum 51 has suction ports 111*a*2 to 111*a*9.

The radial position of the holes 242 corresponding to each suction port 111*c*, 111*c*9, and 111*d*9 has to be in the same row as the hole row 240 (groove row 230) for corresponding suction region 116.

For example, the suction ports 111*c*3 and 111*c*9 are located at the position of the second region 116B. Thus, the holes 242 of the second member 204 of the rotary valve 200 corresponding to the suction ports 111*c*3 and 111*c*9 are provided in the hole row 240D corresponding to the innermost groove row 230D.

The suction port 111*d*9 is located at the position of the third region 116C of the suction regions 116. Thus, the hole 242 of the second member 204 of the rotary valve 200 corresponding to the suction port 111*d*9 is provided in the hole row 240B corresponding to the groove row 230B that is third from the innermost groove row 230D toward an outer peripheral side of the first member 203.

In order to match a rotation angle of the first member 203 of the rotary valve 200 with the size of the sheet P to be sucked and conveyed, circumferential positions of the holes 242 communicating with the suction ports 111*c*3, 111*c*9, and 111*d*9 correspond to the positions of the suction ports 111*c*3, 111*c*9, and 111*d*9 of the drum 51.

The axial positions of the suction ports 111*c*3, 111*c*9, and 111*d*9 on both outer sides in the axial direction of the drum 51 are preferably aligned with the corresponding suction ports 111*a* (111*a*3 and 111*a*9) at the downstream side in the circumferential direction of the drum 51. For example, the axial positions of the suction ports 111*c*9 and 111*d*9 are aligned with the axial position of the suction port 111*a*9.

As a result, a leading end portion of the sheet P is sucked by the suction holes 112 corresponding to the suction port 111*a*, and a rear end portion of the sheet P is sucked by the suction holes 112 corresponding to the suction port 111*b*11 when the sheet P corresponding to the sheet region S9 of the maximum size is sucked and conveyed by the sheet conveyor 21, for example. At the same time, both end portions of the sheet P in the axial direction of a middle portion of the sheet P in the conveyance direction is sucked by the suction holes 112 corresponding to the suction ports 111*c*3, 111*c*9, and 111*d*9.

Therefore, the sheet conveyor 21 including the sheet suction device 50 can reduce the floating of the sheet P at the intermediate portion of the sheet P and stably suction and convey the sheet P even when the sheet P having a large size is conveyed.

Figure 26:
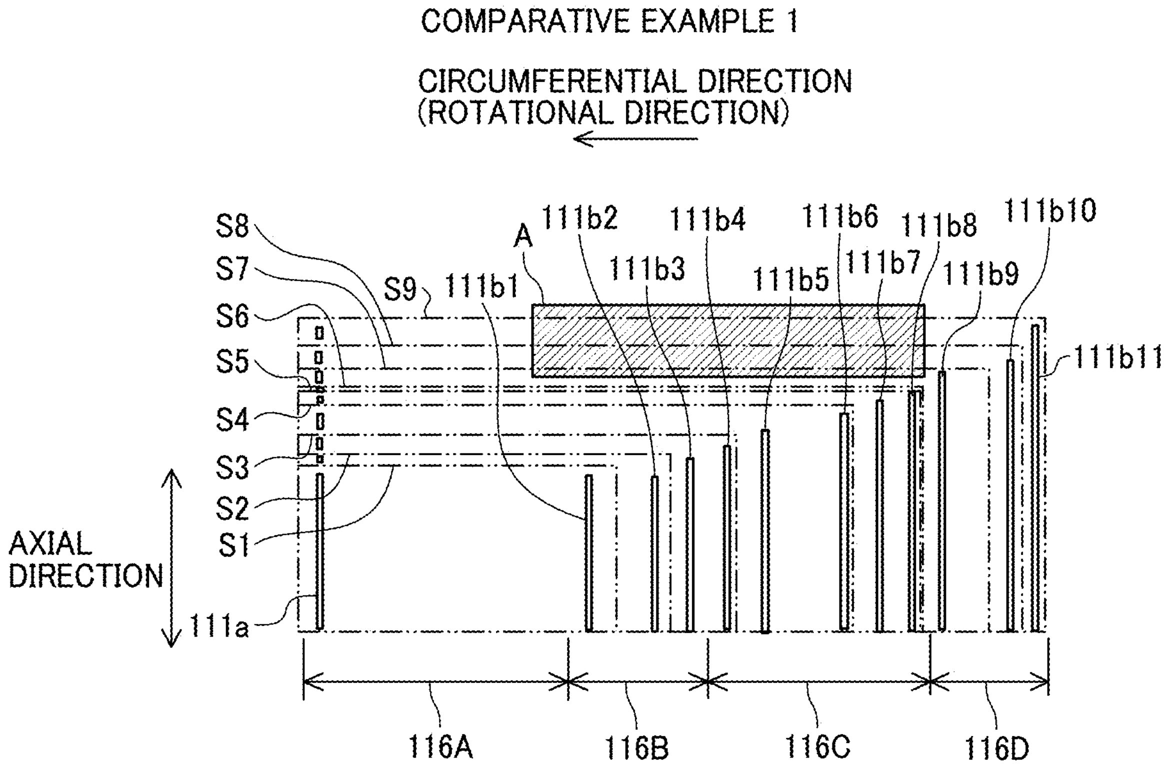
FIG. 26 is an enlarged schematic plan view of a drum according to a comparative example illustrating an arrangement of suction ports and the sheet size in a circumferential direction of the drum.

When the drum 51 does not have the suction ports 111*c*3, 111*c*9, and 111*d*9 as in Comparative Example 1 illustrated in FIG. 26, the sheet suction device 50 does not suck a hatched area "A" indicated in FIG. 26 of the sheet P. Therefore, when a sheet conveyor 21 sucks and conveys the sheet P having a size corresponding to the sheet region S9, the middle portion of the sheet P in the conveying direction may float from the bearing surface of the drum 51.

When the sheet P enters the printing area while the sheet P floating from the bearing surface of the drum 51, the sheet P may come into contact with the nozzle surface of the head 125. Further, the liquid may be applied to the sheet P while the sheet P floats from the bearing surface of the drum 51 so that printing quality may decrease.

Therefore, the drum 51 according to the first embodiment includes the suction ports 111*c*3, 111*c*9, and 111*d*9 in the region A (see FIGS. 22 and 26). Thus, the sheet suction device 50 can reduce the floating of the sheet P from the bearing surface of the drum 51 at the middle portion of the sheet P when the sheet conveyor 21 suctions and conveys the sheet P having a size corresponding to the sheet region S9. Therefore, the sheet conveyor 21 can stably suck (attracts) and convey the sheet P.

The number of the suction ports 111*c* (111*c*3 and 111*c*9) and 111*d* (111*d*9) may be smaller than the number of the suction ports 111*a* (nine, for example) as long as the number and arrangement of the suction ports 111*c* (111*c*3 and 111*c*9) and 111*d* (111*d*9) can reduce the floating of the sheet P from the bearing surface of the drum 51.

As described above, the suction plate 102 of the sheet suction device 50 according to the first embodiment includes the multiple suction holes 112 (suction ports) in the bearing region of the drum 51. The multiple suction holes 112 of the suction plate 102 are arranged in the circumferential direction and the axial direction of the drum 51.

The multiple suction holes 112 disposed in the circumferential direction of the suction plate 102 communicate with the suction ports 111*a* and 111*b*1 to 111*b*11. The suction ports 111*a* and 111*b*1 to 111*b*11 are coupled to and sucked by the suction device 52 at different timings from the downstream side to the upstream side in the circumferential direction of the drum 51 (see FIG. 22). The suction device 52 serves as a suction device.

The suction holes 112 communicating with the suction ports 111*c*3, 111*c*9, and 111*d*9, and the suction ports 111*b*1 and 111*b*5 excludes the suction holes 112 communicating with the suction ports 111*a* and 111*b*9 (see FIG. 6). The suction holes 112 disposed downstream side and downstream side in the circumferential direction of the drum 51 communicate with the suction ports 111*a* and 111*b*9. The suction ports 111*c*3, 111*c*9, and 111*d*9 and the suction ports 111*b*1 and 111*b*5 are coupled to and sucked by the suction device 52 at the same timing (see FIG. 6). The suction ports 111*c*3, 111*c*9, and 111*d*9 communicate with the suction holes 112 disposed on both outer sides in the axial direction of the drum 51. The suction ports 111*b*1 and 111*b*5 communicate with the suction holes 112 disposed on the inner side in the axial direction of the drum 51.

The suction device 52 sucks the multiple suction ports 111 of the multiple suction regions 116 (116A, 116B, 116C, and 116D) at different times in an order of the downstream region (first region 116A), the middle region (second region 116B and third region 116C), and the upstream region (fourth region 116D) in a direction opposite to the circumferential direction (rightward direction in FIG. 6), and the suction device 52 sucks the multiple suction ports 111*c*3, 111*c*9, and 111*d*9 at said both outer sides and the multiple suction ports 111*b*1 and 111*b*5 in an inner side between said both outer sides in the axial direction of the drum 51 in the middle region (second region 116B and third region 116C) at the same time.

Accordingly, the sheet suction device 50 according to the first embodiment can reduce the floating of the sheet from the bearing surface of the drum 51 (bearer). Therefore, the sheet conveyor 21 can stably suck (attracts) and convey the sheet P.

The sheet suction device 50 according to a second embodiment of the present disclosure is described below with reference to FIGS. 27(*a*) and 27(*b*).

Figure 27:
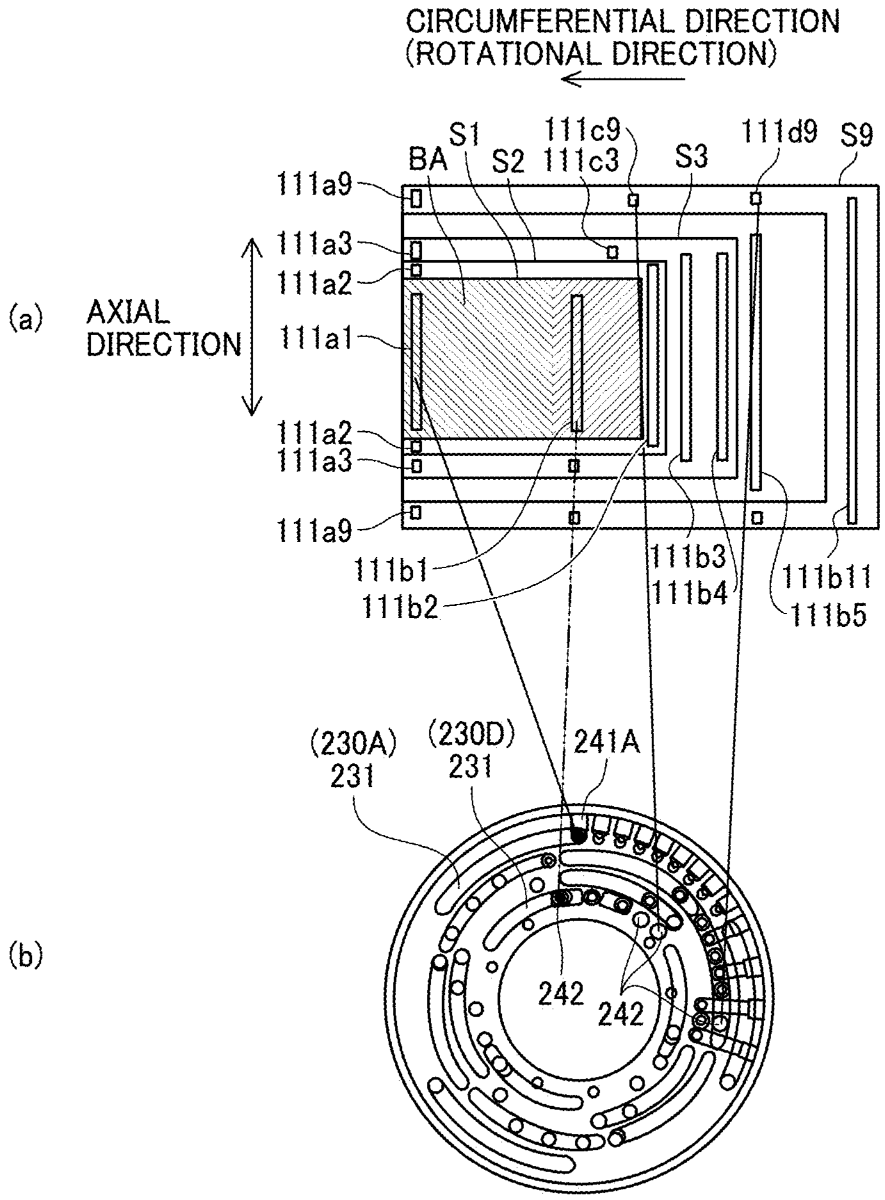
FIGS. 27(*a*) and 27(*b*) are schematic plan view and side view of the rotary valve illustrating changing of suction regions (size changing) according to a second embodiment of the present disclosure.

FIGS. 27(*a*) and 27(*b*) illustrate the sheet suction device 50 according to the second embodiment of the present disclosure.

FIG. 27(*a*) is a schematic plan view of the drum 51 illustrating the size of the sheet P and the suction ports 111 on the drum 51.

FIG. 27(*b*) is a schematic transparent side view of the first member 203 and the second member 204.

The sheet suction device 50 according to the second embodiment includes the suction ports 111*c*3 and 111*c*9 in the first embodiment, the circumferential positions of which are different from each other in the circumferential direction of the drum 51 (see FIGS. 22(*a*) and 27). Further, each of the circumferential positions of the suction ports 111*c*3 and 111*c*9 is different from the circumferential position of the suction port 111*b*1 in the circumferential direction of the drum 51 (see FIGS. 22(*a*) and 27).

That is, the sheet suction device 50 can reduce the floating of the sheet P from the bearing surface of the drum 51 even if the suction ports 111*b*1, 111*c*3, and 111*c*9 are disposed at different positions in the circumferential direction. In other words, the circumferential positions of the suction ports 111*c*3 and 111*c*9 may be within the second region 116B when the suction port 111*b*1 is sucked (coupled to the suction device 52) at the timing of the second region 116B.

The sheet suction device 50 according to a third embodiment of the present disclosure is described with reference to FIG. 28.

Figure 28:
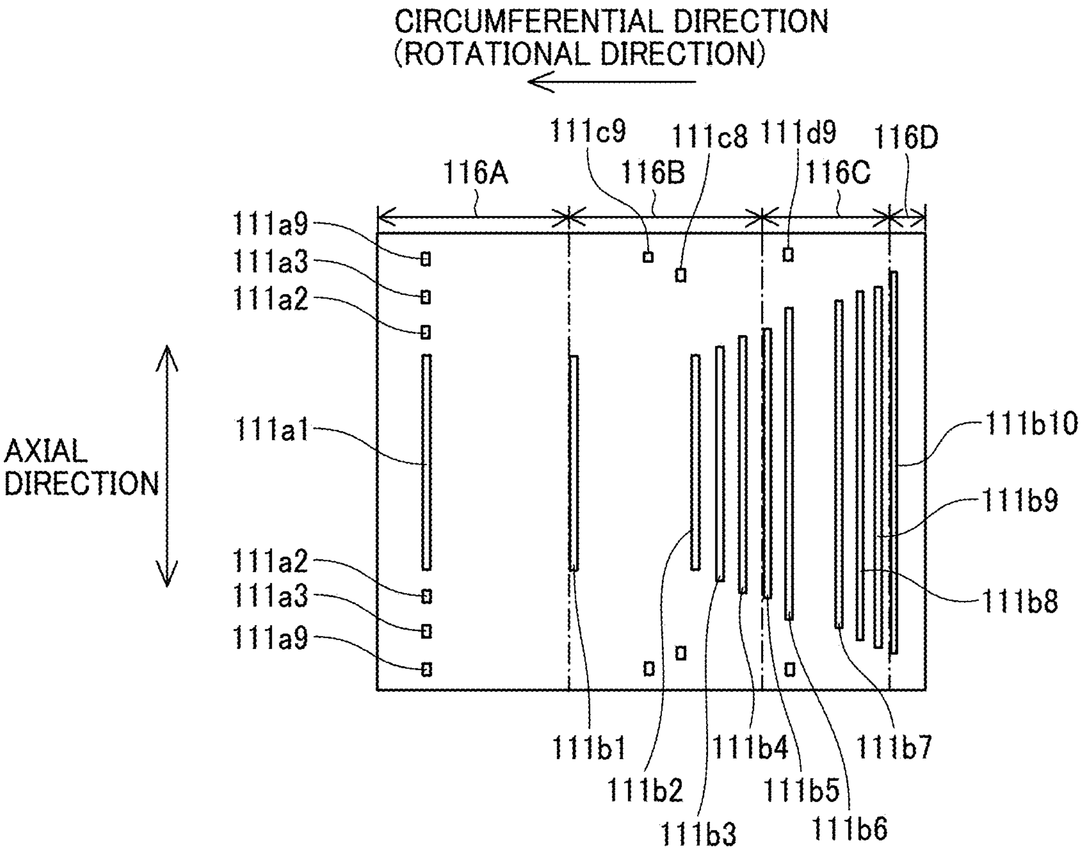
FIG. 28 is a schematic plan view of arrangement of suction ports and suction regions (suction areas) according to a third embodiment of the present disclosure.

FIG. 28 is a schematic plan view of arrangement of suction ports 111 and suction regions (suction areas) according to the third embodiment of the present disclosure.

The sheet suction device 50 according to the third embodiment includes the suction ports 111*a* (111*a*1 to 111*a*9) that are arranged in the axial direction of the drum 51 and are on the downstream side in the circumferential direction of the drum 51. The sheet suction device 50 further includes ten suction ports 111 (111*b*1 to 111*b*10) that are arranged in the circumferential direction of the drum 51.

Here, the suction port 111*a* is disposed in the first region 116A, and the suction ports 111*b*1 to 111*b*4 are disposed in the second region 116B. The suction ports 111*b*5 to 111*b*9 are disposed in the third region 116C, and the suction port 111*b*10 is disposed in the fourth region 116D.

The suction ports 111*c*8 and 111*c*9 are arranged at different positions in the circumferential direction on both sides in the axial direction of the drum 51 in the second region 116B. In this case, the suction ports 111*c*8 and 111*c*9 serve as suction ports 111 of both outer side in the axial direction of the drum 51. The suction ports 111*b*1 to 111*b*4 serve as the suction ports 111 of inner side (central side) in the axial direction of the drum 51.

The suction port 111*c*8 is disposed within a region corresponding to a difference between the sheet region S7 and the sheet region S8 according to the first embodiment (see FIGS. 6 and 28). The suction port 111*c*9 is disposed within a region corresponding to a difference between the sheet region S8 and the sheet region S9 according to the first embodiment (see FIGS. 6 and 28).

The suction ports 111*d*9 are disposed on both sides in the axial direction of the drum 51 in the third region 116C. In this case, the suction ports 111*d*9 serve as suction ports 111 of both outer side in the axial direction of the drum 51. The suction ports 111*b*5 to 111*b*9 serve as the suction ports 111 of inner side (central side) in the axial direction of the drum 51.

In the above configuration, two suction ports 111*c*8 and 111*c*9 are disposed on both outer sides in the axial direction of the drum 51 in the second region 116B that is downstream of the third region 116C. One suction port 111*d*9 is disposed on both outer sides in the axial direction of the drum 51 in the third region 116C that is upstream side in the circumferential direction of the drum 51.

Therefore, the number of suction holes 112 sucked at the same timing in the third region 116C is smaller than the number of suction holes 112 sucked at the same timing in the second region 116B. The third region 116C is disposed upstream of the second region 116B in the circumferential direction of the drum 51.

Thus, a number of the suction ports 111 in the middle region (second region 116B and third region 116C) decreases toward the upstream region (fourth region 116D) in the circumferential direction.

Next, effects of the sheet suction device 50 in the third embodiment when the sheet suction device 50 sections and conveys the sheet P of maximum size is described below with reference to FIGS. 29A and 29B to FIGS. 34A and 34B.

FIGS. 29A and 29B to FIGS. 34A and 34B are used to illustrate the effects of the above embodiments.

Each of FIGS. 29A, 30A, 31A, 32A, 33A, and 34A are schematic side views of the sheet conveyor 21, the transfer cylinder 24, and the delivery cylinder 25 illustrating a relation between the fixing part 201 and the drum 51.

Each of FIGS. 29B, 30B, 31B, 32B, 33B, and 34B are schematic plan views of the drum 51 illustrating a suctioning and non-suctioning of the suction port 111.

The sheet conveyor 21 in this embodiment includes a pressing roller 1000 around the drum 51. The pressing roller 1000 presses the sheet P against the bearing surface of the drum 51 at a suction start position. The drum 51 serves as a bearer.

Thus, the pressing roller (1000) is configured to press the sheet P against the circumferential surface of the drum 51 at the suction start position at which the suction device 52 starts suctioning the sheet P through the multiple suction ports 111.

Figure 29B:
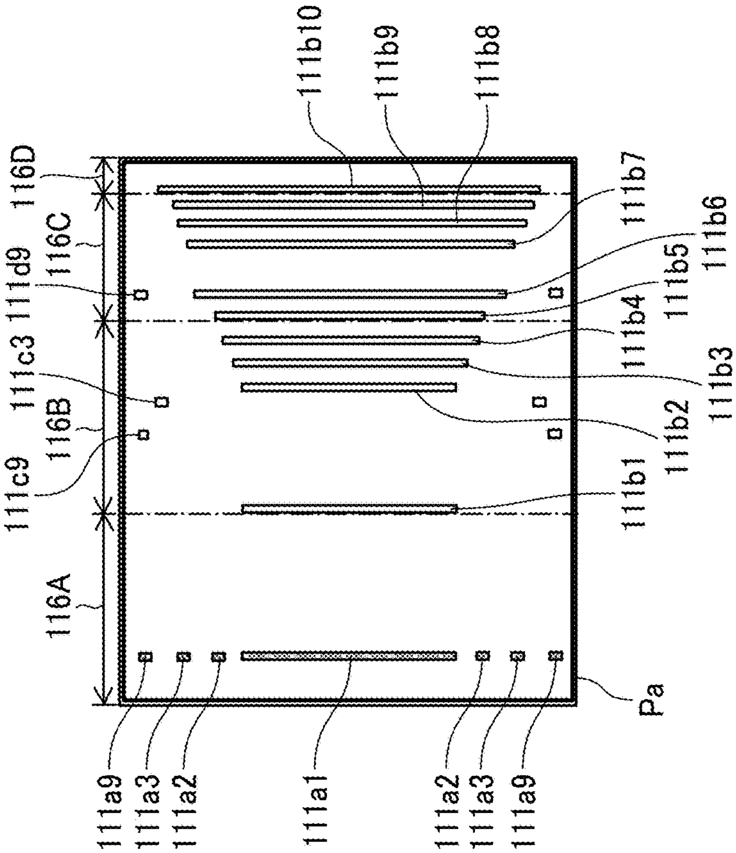
FIGS. 29A and 29B are schematic plan view and side view of the rotary valve illustrating effects of the sheet suction device when the sheet suction device suctions and conveys the sheet of maximum size in the third embodiment.
Figure 29A:
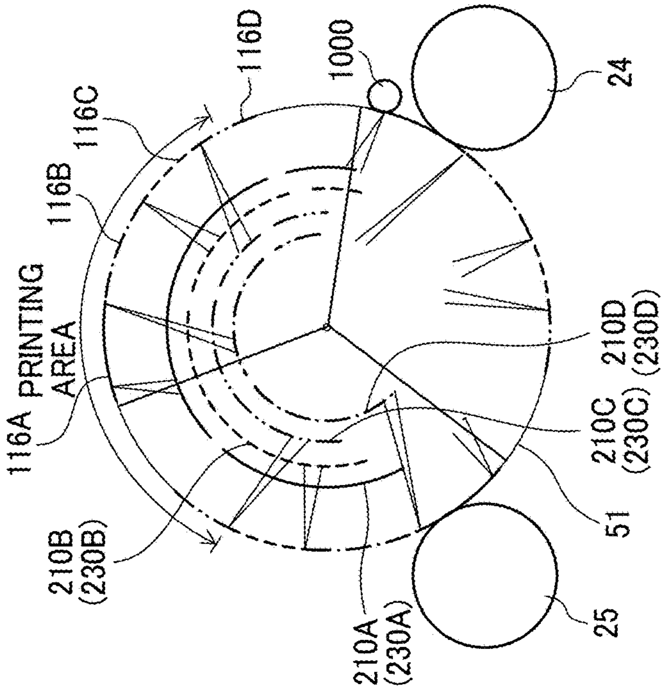

First, when the drum 51 (rotator 202) reaches a position illustrated in FIG. 29A with respect to the fixing part 201, the sheet suction device 50 sucks the suction ports 111*a*1 to 111*a*9 of the first region 116A shaded (blackened) in FIG. 29B. The sheet Pa of the maximum size is attracted to the bearing surface of the drum 51 and pressed against the bearing surface (surface) of the drum 51 by the pressing roller 1000.

Figure 30B:
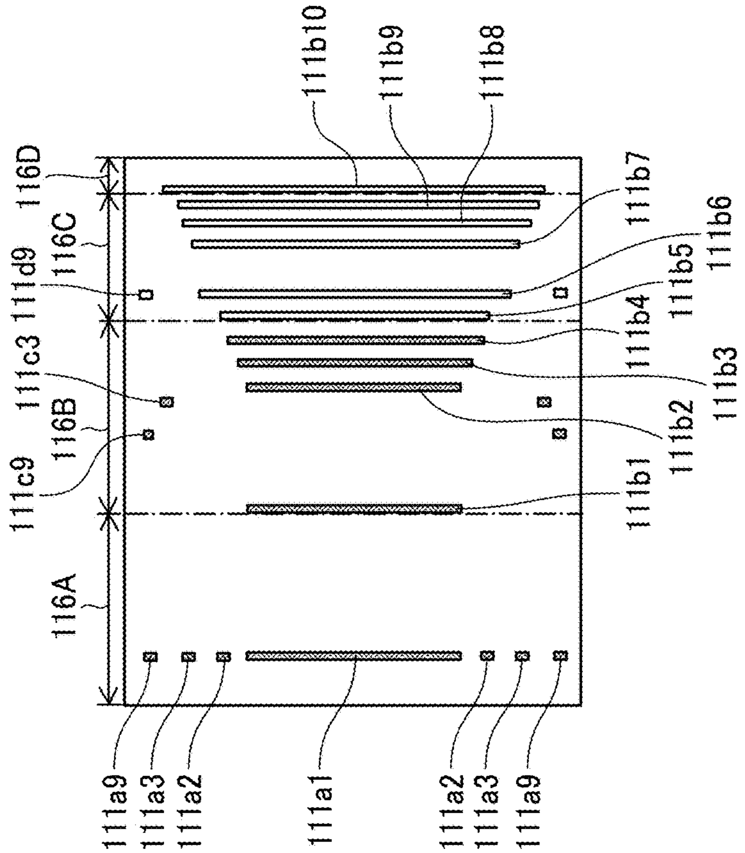
FIGS. 30A and 30B are schematic plan view and side view of the rotary valve illustrating effects of the sheet suction device following FIGS. 29A and 29B.
Figure 30A:
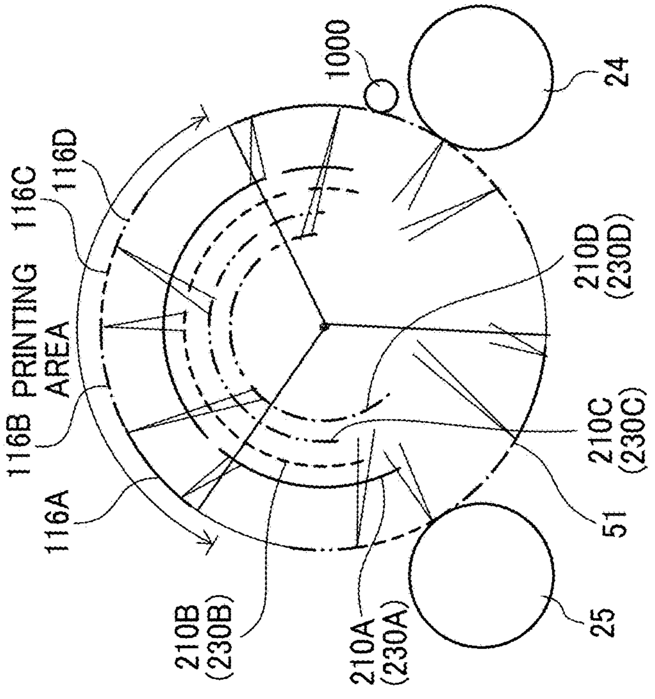

Next, when the drum 51 (rotator 202) moves to the position illustrated in FIG. 30A with respect to the fixing part 201, the sheet suction device 50 sucks the suction ports 111*b*1 to 111*b*4, and the sheet suction device 50 also sucks the suction ports 111*c*3 and 111*c*9 on both sides in the axial direction of the drum 51. The suction ports 111*b*1 to 111*b*4 are on an inner side in the axial direction of the drum 51 in the second region 116B shaded (blackened) in FIG. 30B.

Figure 31B:
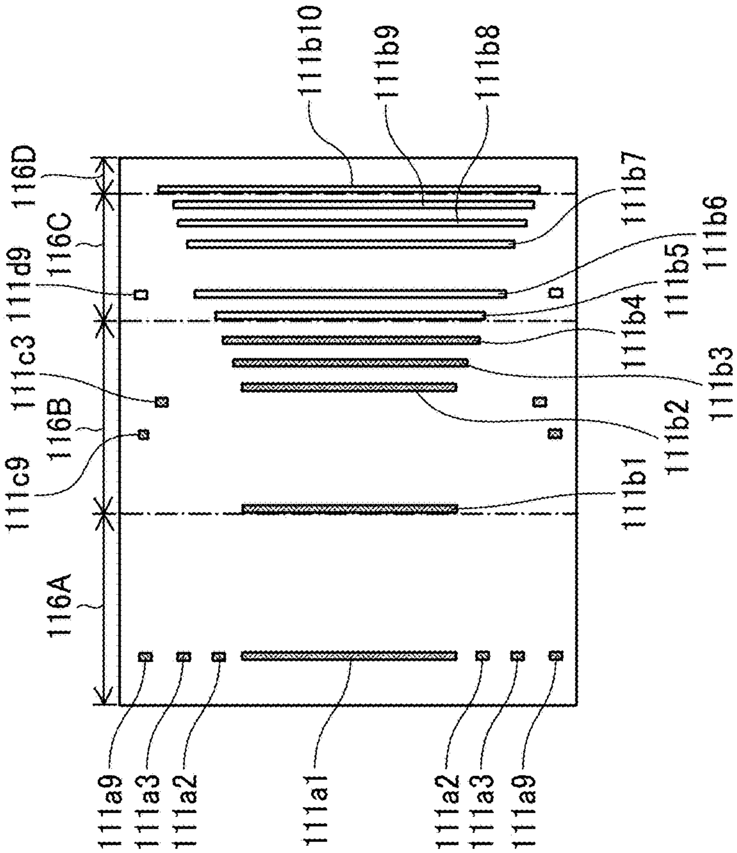
FIGS. 31A and 31B are schematic plan view and side view of the rotary valve illustrating effects of the sheet suction device following FIGS. 30A and 30B.
Figure 31A:
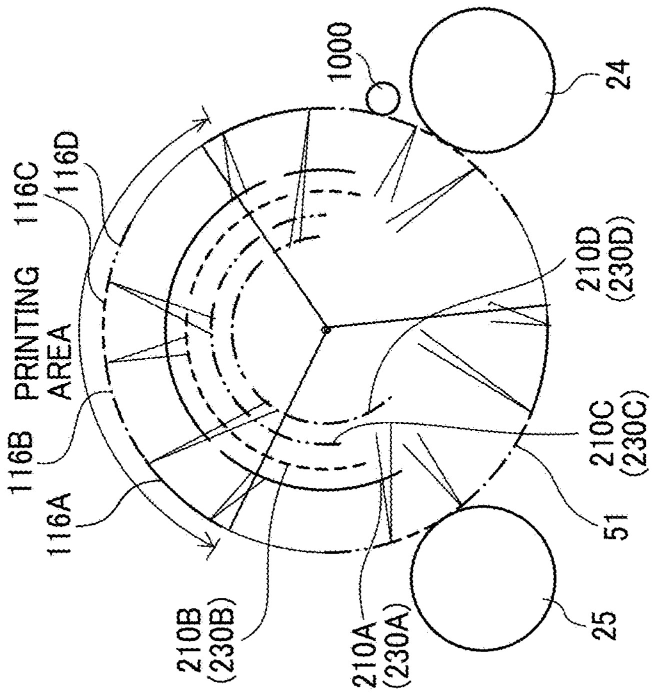

Next, when the drum 51 (rotator 202) moves to the position illustrated in FIG. 31A with respect to the fixing part 201, the leading end of the sheet Pa (first region 116A) enters a printing area.

At this time, the sheet suction device 50 sucks the suction ports 111*a*1 to 111*a*9 in the first region 116A and the suction ports 111*b*1 to 111*b*4 in the inner side in the axial direction of the drum 51 in the second region 116B shaded (blackened) in FIG. 30B. Therefore, the sheet suction device 50 sucks and attracts a leading end portion side (region of the first region 116A) and a middle portion (region of the second region 116B) of the sheet Pa to the drum 51 so that the sheet suction device 50 can reduce the floating of the sheet Pa from the bearing surface of the drum 51 that cause the sheet Pa coming into contact with the head 125.

Further, the sheet suction device 50 sucks the suction ports 111*c*3 and 111*c*9 on both outer sides in the axial direction of the drum 51 in the second region 116B so that the sheet suction device 50 can reduce the floating of both sides in the axial direction of the middle portion (region of the second region 116B) of the sheet Pa.

In this case, when the sheet P enters the printing area, the sheet suction device 50 sucks the suction holes 112 communicating with the suction ports 111*b*1 to 111*b*4 and the suction holes 112 communicating with the suction ports 111*a*1 to 111*a*9 on the downstream side in the circumferential direction (rotational direction) of the drum 51 excluding the suction holes 112 communicating with the suction ports 111*a* and 111*b*10 on the upstream side and downstream side in the circumferential direction of the drum 51.

The sheet suction device 50 does not suck the suction hole 112 communicating with the suction ports 111*b*5 to 111*b*10 on the upstream side in the circumferential direction (rotational direction) of the drum 51.

The suction device 52 gradually enlarge the multiple suction regions 116 in the order of the downstream region (first region 116A), the middle region (second region 116B and third region 116C), and the upstream region (fourth region 116D) in the direction opposite to the circumferential direction. That is, the multiple suction regions is gradually enlarged from the downstream region (first region 116A) toward the upstream region (fourth region 116D) in a direction opposite to the circumferential direction.

Figure 32A:
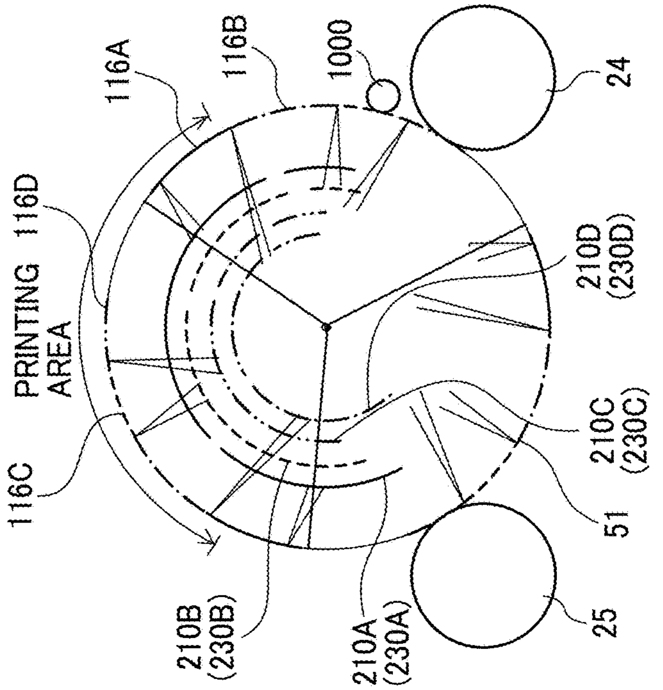
FIGS. 32A and 32B are schematic plan view and side view of the rotary valve illustrating effects of the sheet suction device following FIGS. 31A and 31B.
Figure 32B:
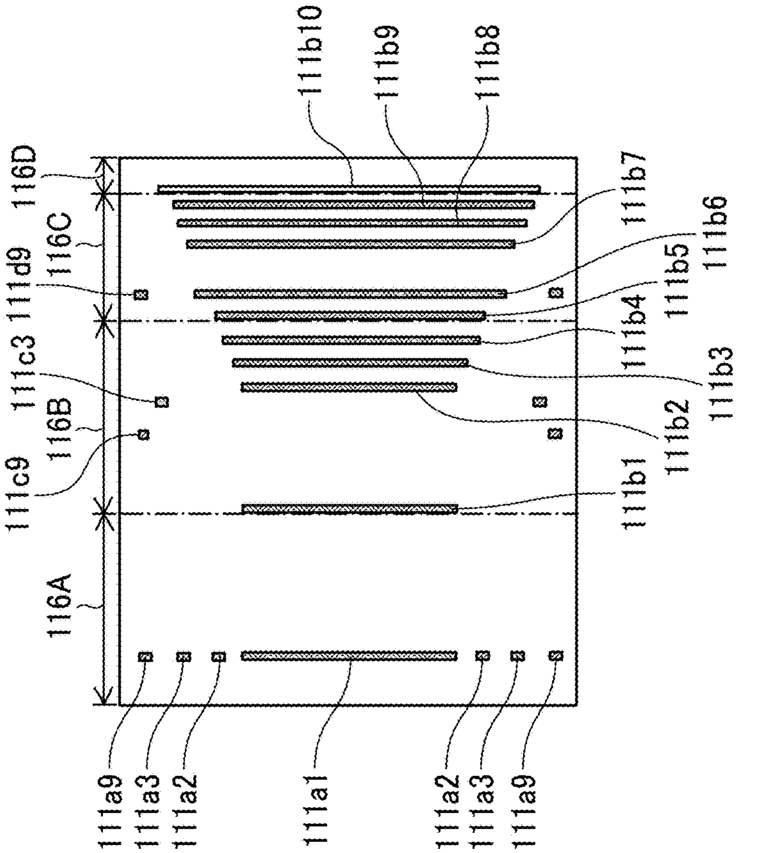

Next, when the drum 51 (rotator 202) comes to the position illustrated in FIG. 32A with respect to the fixing part 201, the sheet suction device 50 sucks the suction ports 111*b*5 to 111*b*9 of the third region 116C shaded (blackened) in FIG. 32B and also sucks the suction ports 111*d*9 on both outer sides of the drum 51. As described above, the suction ports 111*b*4 to 111*b*9 on the inner side in the axial direction of the drum 51 are sucked and the suction ports 111*d*9 on both outer sides in the axial direction of the drum 51 are also sucked so that the sheet suction device 50 can reduce the floating of the middle portion of the sheet Pa in the circumferential (rotational) direction.

Figure 33B:
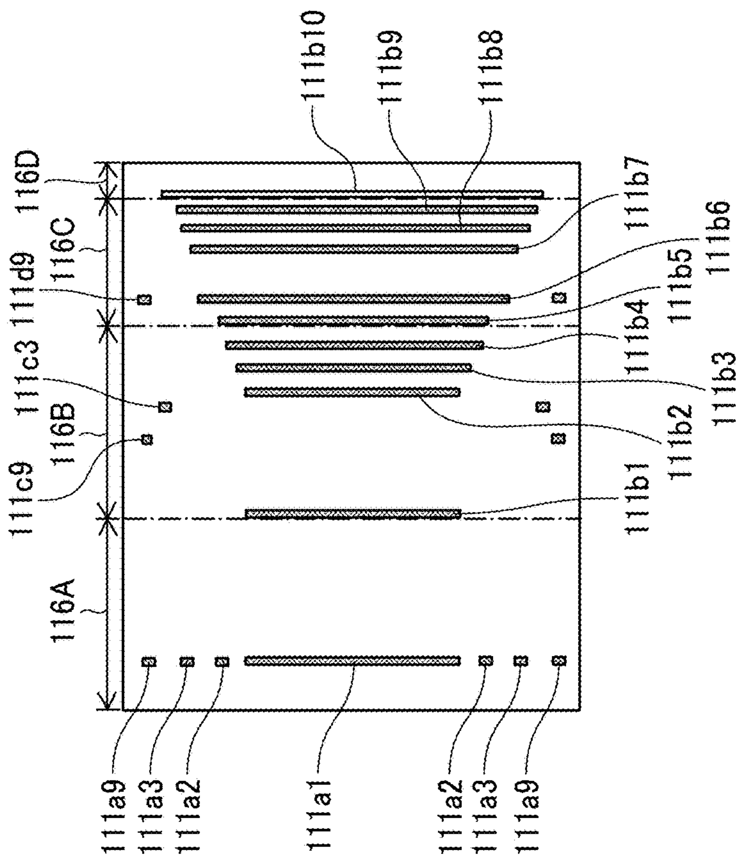
FIGS. 33A and 33B are schematic plan view and side view of the rotary valve illustrating effects of the sheet suction device following FIGS. 32A and 32B.
Figure 33A:
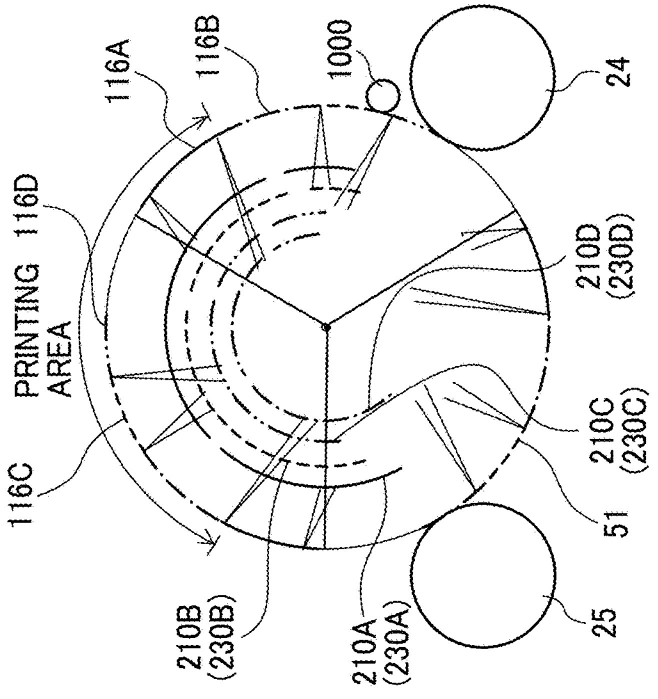

Next, when the drum 51 (rotator 202) moves to the position illustrated in FIG. 33A with respect to the fixing part 201, the middle region (second region 116B) of the sheet Pa enters the printing area.

At this time, the sheet suction device 50 sucks the suction ports 111*a*1 to 111*a*9 in the first region 116A, the suction ports 111*b*1 to 111*b*4 on the inner side in the axial direction of the drum 51 in the second region 116B, and the suction ports 111*b*5 to 111*b*9 in the inner side in the axial direction of the drum 51 of the third region 116C, which are shaded (blackened) in FIG. 33B.

Therefore, the sheet suction device 50 sucks and attracts the leading end portion side (region of the first region 116A) and a middle portion (region of the second region 116B and the third region 116C) of the sheet Pa to the drum 51 so that the sheet suction device 50 can reduce the floating of the sheet Pa from the bearing surface of the drum 51 that causes the sheet Pa coming into contact with the head 125.

Further, the sheet suction device 50 sucks the suction ports 111*c*3 and 111*c*9 on both outer sides in the axial direction of the drum 51 in the second region 116B and the suction port 111*d*9 on both outer sides in the axial direction of the drum 51 in the third region 116C so that the sheet suction device 50 can reduce the floating of both sides in the axial direction of the middle portion (regions of the second region 116B and the third region 116C) of the sheet Pa.

Figure 34B:
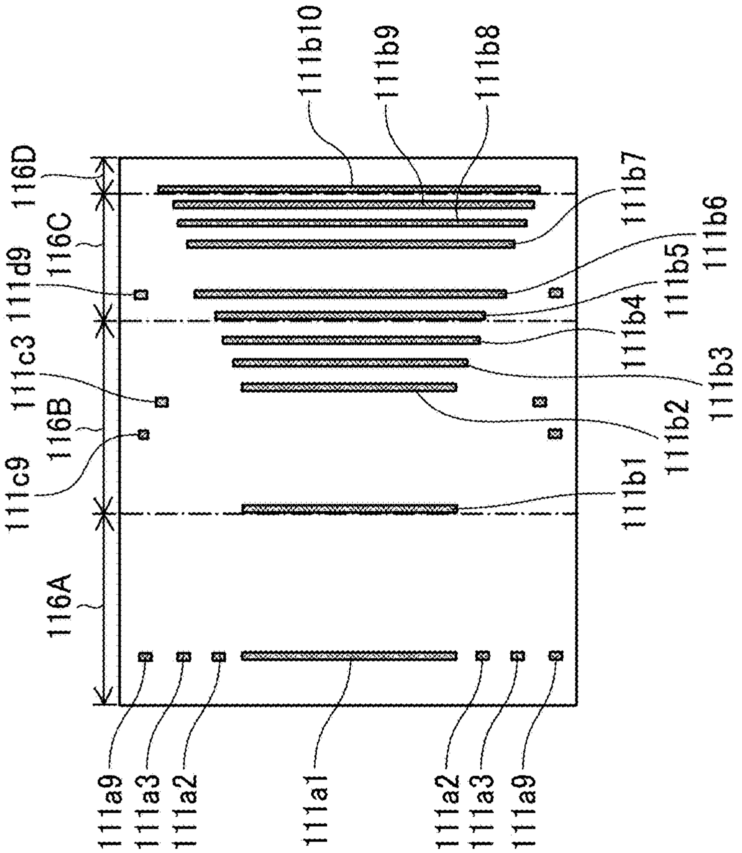
FIGS. 34A and 34B are schematic plan view and side view of the rotary valve illustrating effects of the sheet suction device following FIGS. 33A and 33B.
Figure 34A:
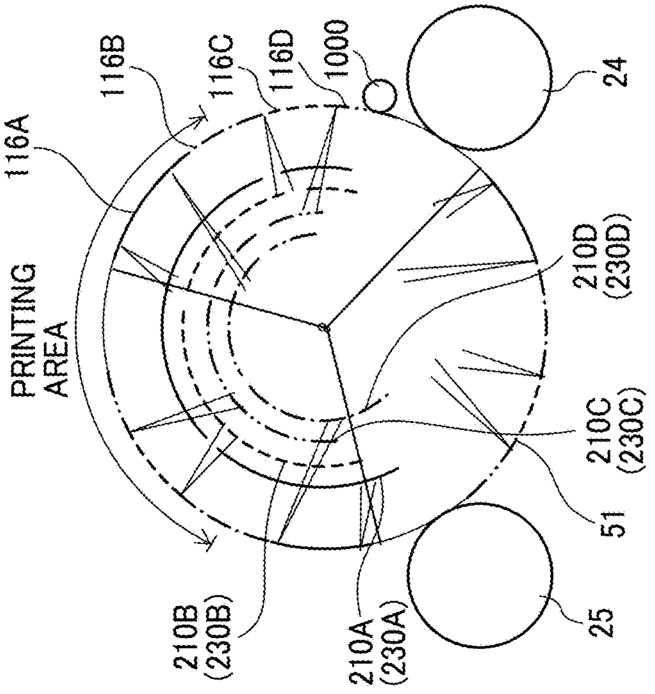

Next, when the drum 51 (rotator 202) reaches the position illustrated in FIG. 34A with respect to the fixing part 201, the sheet suction device 50 sucks the suction port 111*b*10 of the fourth region 116D shaded (blackened) in FIG. 34B. As described above, the sheet suction device 50 sucks all the suction ports 111*a*1 to 111*a*9, 111*b*1 to 111*b*10, 111*c*3, 111*c*9, and 111*d*9 so that the sheet suction device 50 can reliably reduce the floating of the sheet Pa in the printing area and stably conveys the sheet Pa.

Next, effects of the sheet suction device 50 in the present embodiment when the sheet suction device 50 suctions and conveys the sheet P having one size smaller than the maximum size is described below with reference to FIGS. 35A and 35B to FIGS. 40A and 40B.

FIGS. 35A and 35B to FIGS. 40A and 40B are used to illustrate the effects of the present embodiment.

Each of FIGS. 29A, 30A, 31A, 32A, 33A, and 34A are schematic side views of the sheet conveyor 21, the transfer cylinder 24, and the delivery cylinder 25 illustrating a relation between the fixing part 201 and the drum 51.

Each of FIGS. 29B, 30B, 31B, 32B, 33B, and 34B are schematic plan views of the drum 51 illustrating a suctioning and non-suctioning of the suction port 111.

Here, it is described below an example in which the sheet suction device 50 suctions (attracts) and conveys the sheet Pb having a size illustrated in FIG. 35B. The sheet Pb has a size corresponding to the sheet region S8 in the first embodiment.

Figure 35B:
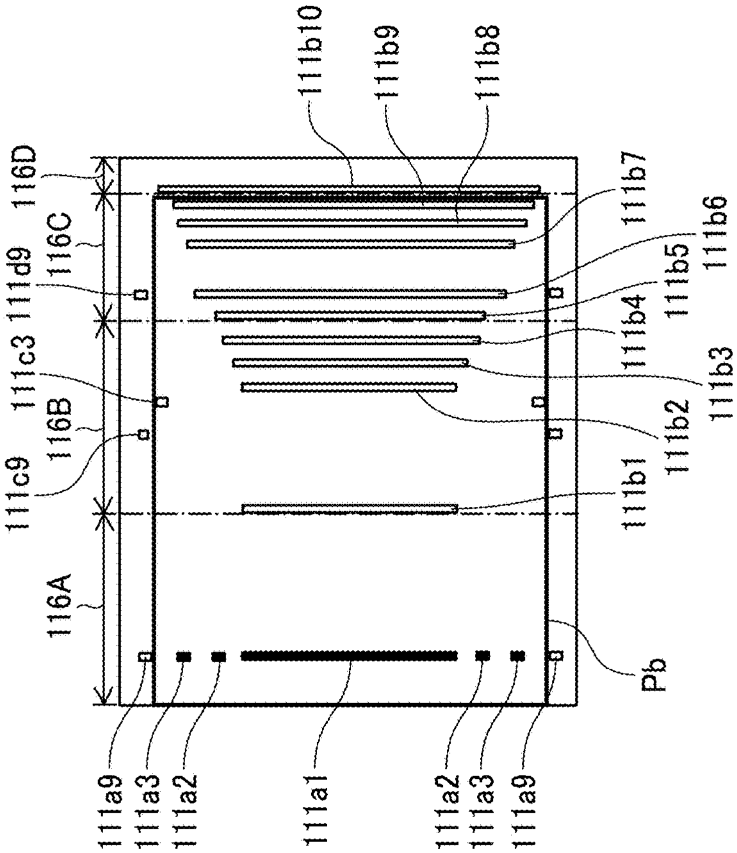
FIGS. 35A and 35B are schematic plan view and side view of the rotary valve illustrating effects of the sheet suction device when the sheet suction device suctions and conveys the sheet having one size smaller than the maximum size in the third embodiment.
Figure 35A:
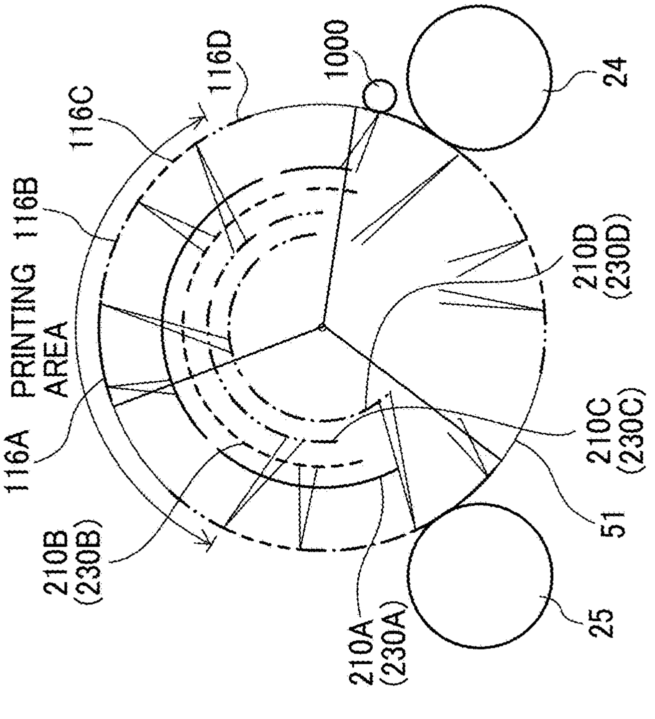

First, when the drum 51 (rotator 202) moves to the position illustrated in FIG. 35A with respect to the fixing part 201, the sheet suction device 50 sucks the suction ports 111*a*1 to 111*a*8 of the first region 116A shaded (blackened) in FIG. 35B except the suction port 111*a*9.

Note that the sheet suction device 50 according to the third embodiment illustrated in FIG. 35B includes the suction ports 111*a*4 to 111*b*8 that are same as the suction ports 111*a*4 to 111*b*8 illustrated in FIGS. 7, 21, and 22 in the first embodiment. The sheet Pb is pressed against the bearing surface of the drum 51 by the pressing roller 1000 while the sheet Pb is attracted onto the bearing surface of the drum 51.

Figure 36B:
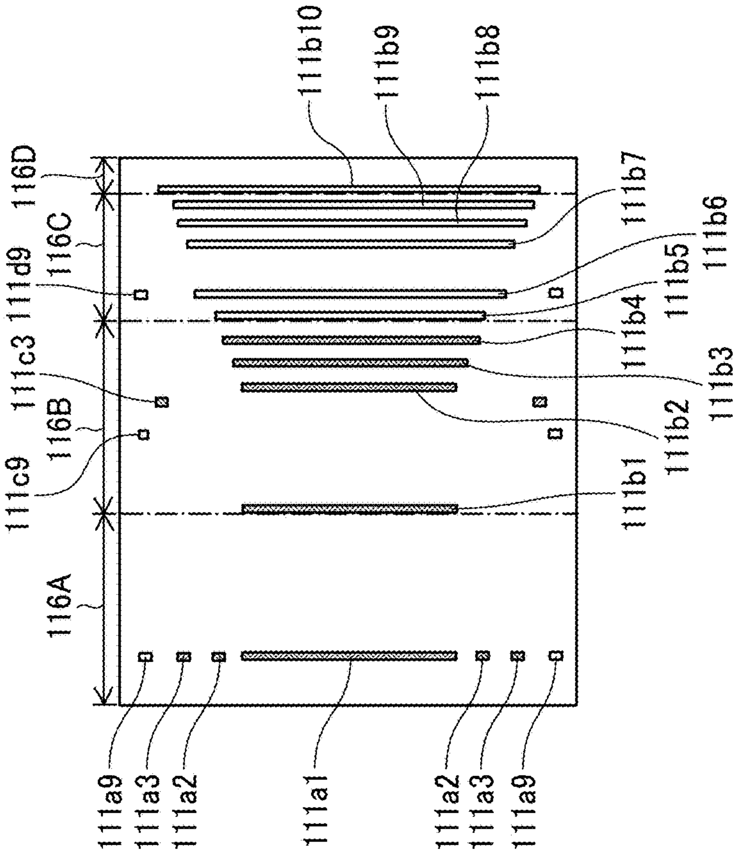
FIGS. 36A and 36B are schematic plan view and side view of the rotary valve illustrating effects of the sheet suction device following FIGS. 35A and 35B.
Figure 36A:
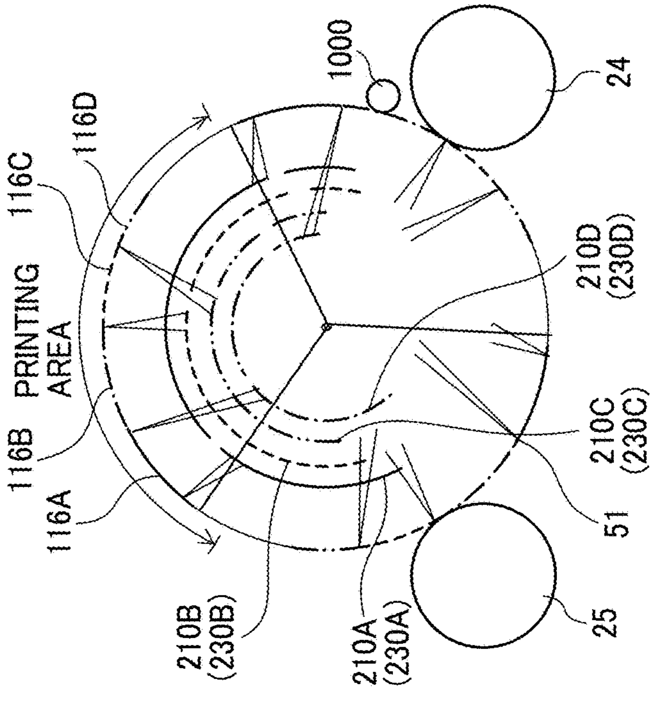

Next, when the drum 51 (rotator 202) moves to the position illustrated in FIG. 36A with respect to the fixing part 201, the sheet suction device 50 sucks the suction ports 111*b*1 to 111*b*4, and the sheet suction device 50 also sucks the suction ports 111*c*3 on both sides in the axial direction of the drum 51. The suction ports 111*b*1 to 111*b*4 are on an inner side in the axial direction of the drum 51 in the second region 116B shaded (blackened) in FIG. 36B. At this time, unlike the case of the sheet Pa having the maximum size, the suction port 111*c*9 is not sucked.

Figure 37A:
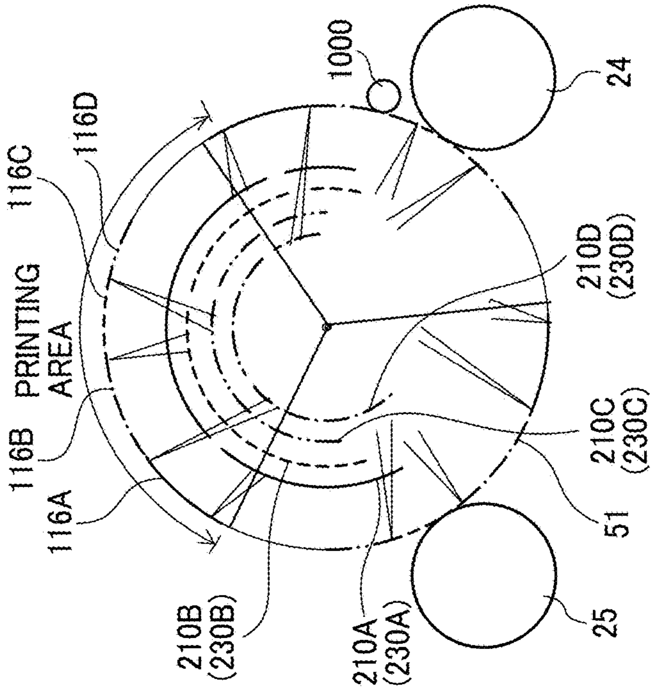
FIGS. 37A and 37B are schematic plan view and side view of the rotary valve illustrating effects of the sheet suction device following FIGS. 36A and 36B.

Next, when the drum 51 (rotator 202) moves to the position illustrated in FIG. 37A with respect to the fixing part 201, the leading end (first region 116A) of the sheet Pb enters the printing area. As described above, the first region 116A is the downstream region of the multiple suction regions 116.

Figure 37B:
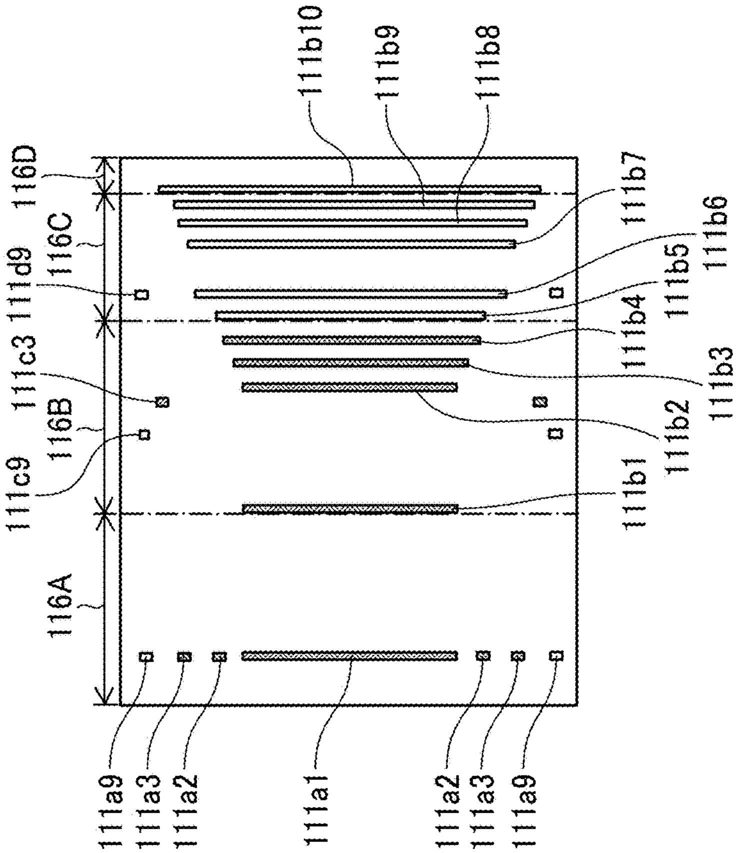

At this time, the sheet suction device 50 sucks the suction ports 111*a*1 to 111*a*9 in the first region 116A and the suction ports 111*b*1 to 111*b*4 in the inner side in the axial direction of the drum 51 in the second region 116B shaded (blackened) in FIG. 37B.

Therefore, the sheet suction device 50 sucks and attracts the leading end portion side (region of the first region 116A) and a middle portion (region of the second region 116B and the third region 116C) of the sheet P to the drum 51 so that the sheet suction device 50 can reduce the floating of the sheet P from the bearing surface of the drum 51 that causes the sheet Pa coming into contact with the head 125.

Further, the sheet suction device 50 sucks the suction ports 111*c*3 on both outer sides in the axial direction of the drum 51 in the second region 116B so that the sheet suction device 50 can reduce the floating of both sides in the axial direction of the middle portion (region of the second region 116B) of the sheet P.

Figure 38B:
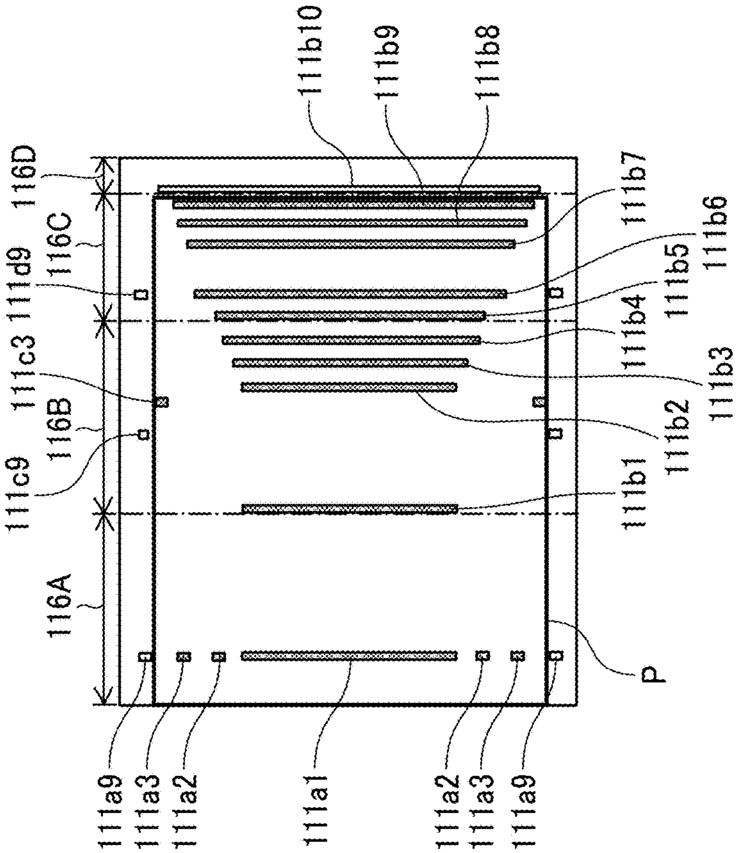
FIGS. 38A and 38B are schematic plan view and side view of the rotary valve illustrating effects of the sheet suction device following FIGS. 37A and 37B.
Figure 38A:
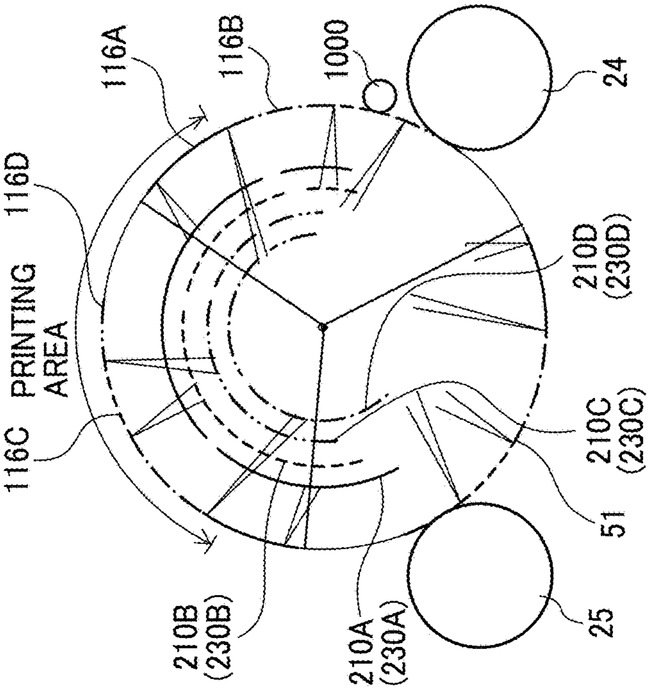

Next, when the drum 51 (rotator 202) moves to the position illustrated in FIG. 38A with respect to the fixing part 201, the sheet suction device 50 further sucks the suction ports 111*b*5 to 111*b*9 in the third region 116C shaded (blackened) in FIG. 38B. At this time, the sheet suction device 50 does not suck the suction ports 111*d*9 on both sides in the axial direction of the drum 51 in the third region 116C.

However, since the sheet Pb has a size smaller than the sheet Pa, the sheet suction device 50 sucks the suction ports 111*b*4 to 111*b*9 on the inner side in the axial direction of the drum 51 to reduce the floating of the middle portion of the sheet Pb.

Figure 39B:
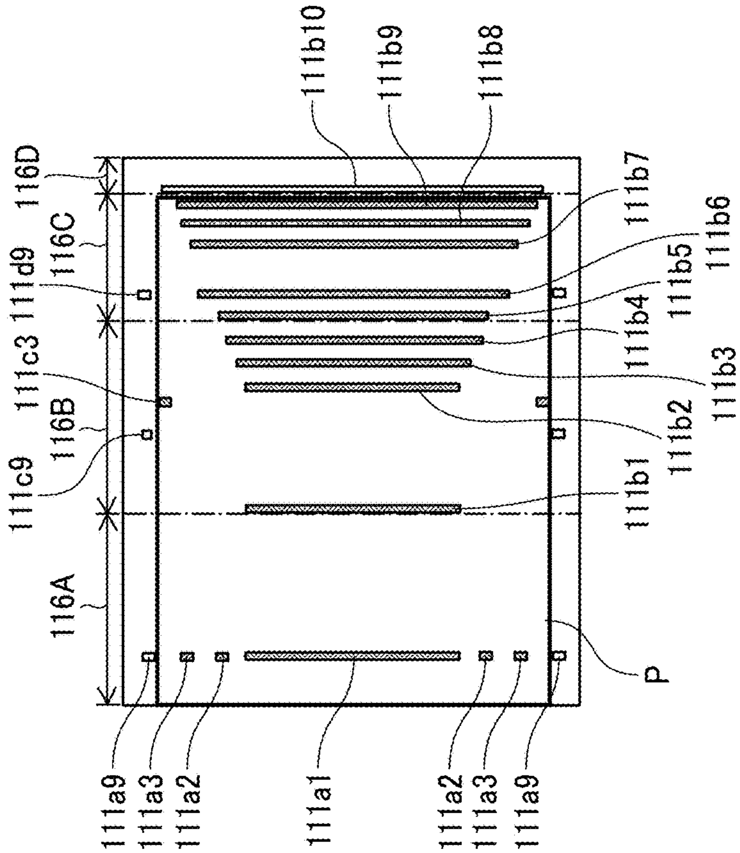
FIGS. 39A and 39B are schematic plan view and side view of the rotary valve illustrating effects of the sheet suction device following FIGS. 38A and 38B.
Figure 39A:
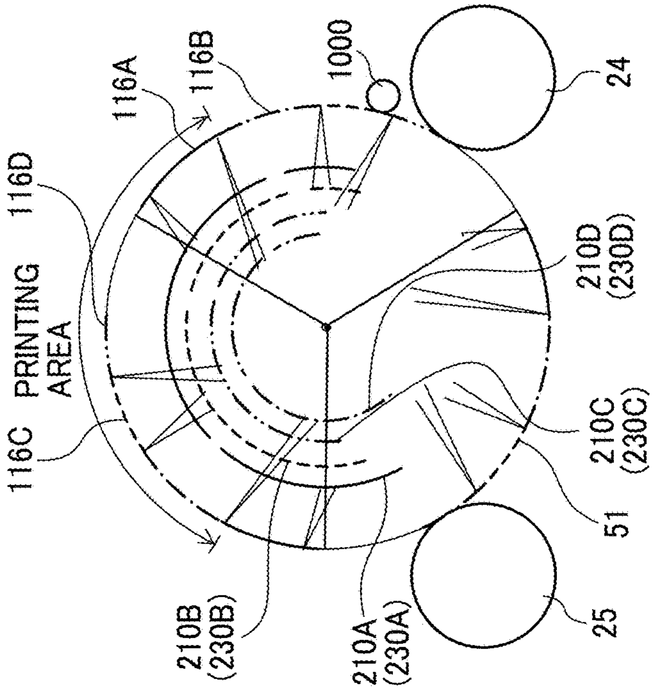

Next, when the drum 51 (rotator 202) moves to the position illustrated in FIG. 39A with respect to the fixing part 201, the middle region (second region 116B) of the sheet Pa enters the printing area.

At this time, the sheet suction device 50 sucks the suction ports 111*a*1 to 111*a*9 in the first region 116A, the suction ports 111*b*1 to 111*b*4 on the inner side in the axial direction of the drum 51 in the second region 116B, and the suction ports 111*b*5 to 111*b*9 in the inner side in the axial direction of the drum 51 in the third region 116C that are shaded (blackened) in FIG. 39B.

Therefore, the sheet suction device 50 sucks and attracts the leading end portion side (region of the first region 116A) and the middle portion (region of the second region 116B and the third region 116C) of the sheet P to the drum 51 so that the sheet suction device 50 can reduce the floating of the sheet P from the bearing surface of the drum 51 that causes the sheet P coming into contact with the head 125.

Further, the sheet suction device 50 sucks the suction ports 116*c*3 on both outer sides in the axial direction of the drum 51 in the second region 116B so that the sheet suction device 50 can reduce the floating of both sides in the axial direction of the middle portion (regions of the second region 116B and the third region 116C) of the sheet P since the sheet P has smaller size than the sheet Pa as described above.

Figure 40B:
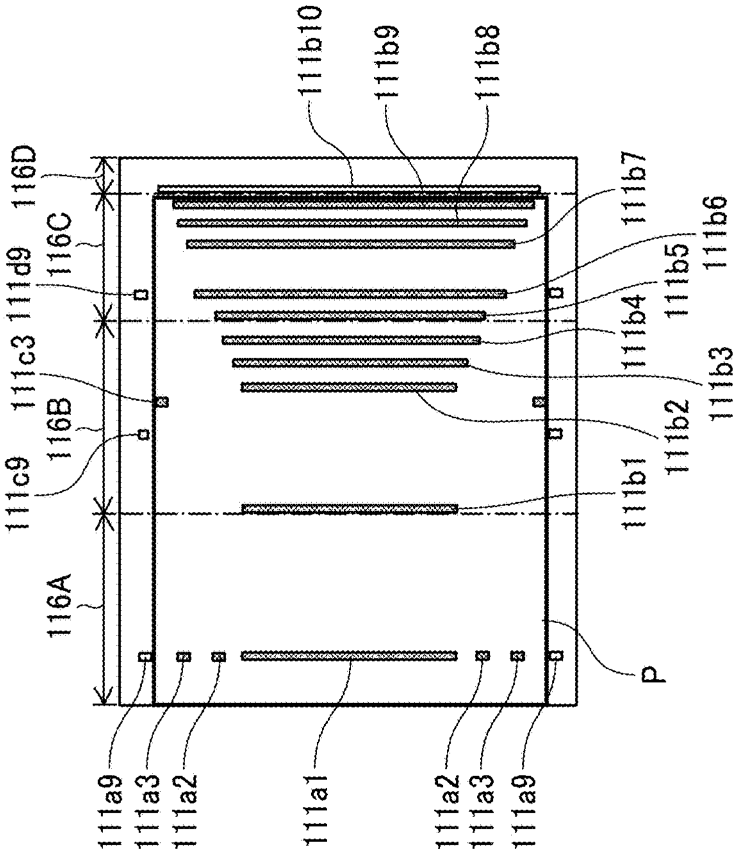
FIGS. 40A and 40B are schematic plan view and side view of the rotary valve illustrating effects of the sheet suction device following FIGS. 39A and 39B.
Figure 40A:
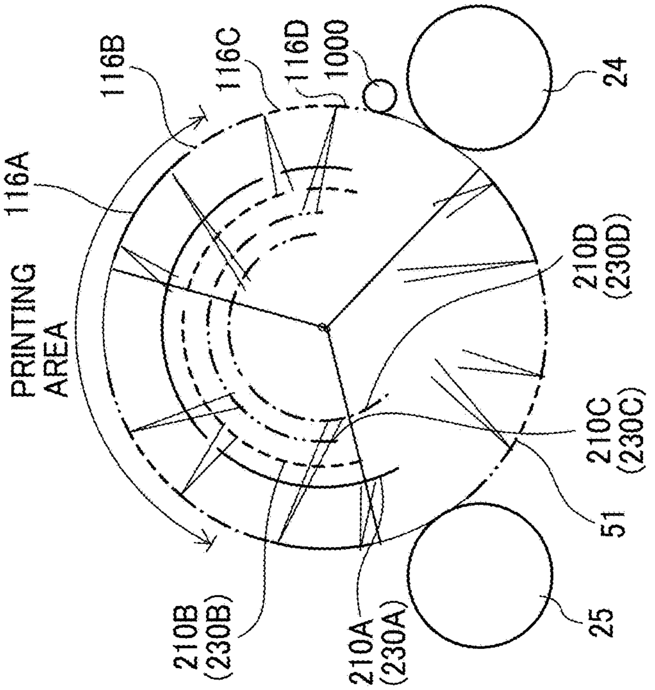

Next, when the drum 51 (rotator 202) moves to the position illustrated in FIG. 40A with respect to the fixing part 201, the sheet suction device 50 sucks the suction port 111*b*10 of the drum 51 in the fourth region 116D shaded (blackened) in FIG. 40B. As described above, the sheet suction device 50 sucks all the suction ports 111*a*1 to 111*a*9, 111*b*1 to 111*b*10, 111*c*3, 111*c*9, and 111*d*9 so that the sheet suction device 50 can reliably reduce the floating of the sheet P in the printing area and stably conveys the sheet P.

Next, the sheet suction device 50 according to a fourth embodiment of the present disclosure is described with reference to FIGS. 41 and 42.

Figure 42:
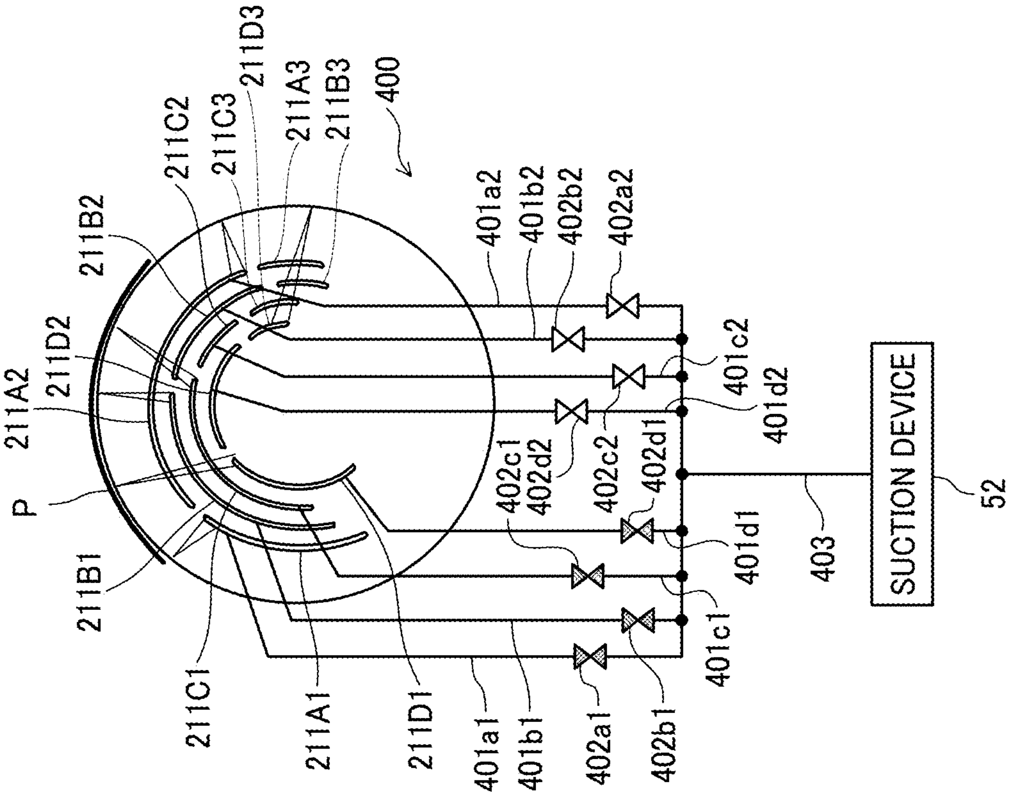
FIG. 42 is a schematic side view of the sheet suction device in a state switched from a state illustrated in FIG. 41.
Figure 41:
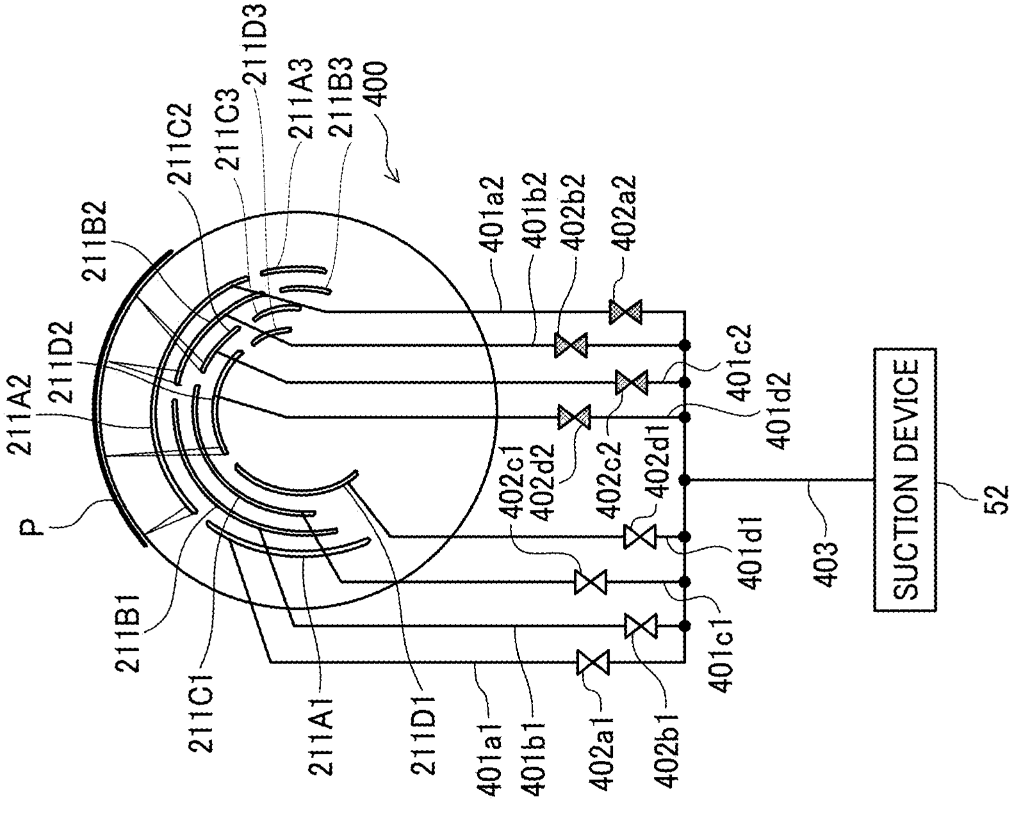
FIG. 41 is a schematic side view of the sheet suction device including a switch that switches suctioning and un-suctioning of the suction port by the sheet suction device in multiple bearing regions of the drum according to a fourth embodiment of the present disclosure.

FIGS. 41 and 42 are schematic side views of the sheet suction device 50 including a switch 400. The switch 400 switches suctioning and un-suctioning of the suction port 111 by the sheet suction device 50 in multiple bearing regions of the drum 51 according to the fourth embodiment.

The sheet suction device 50 includes a switch 400 that includes a fixing part 201 and switch valves 402. The switch valves 402 includes switch valves 402*a*1 to 402*d*1 and 402*a*2 to 402*d*2. The fixing part 201 serves as a fixing member. The switch valves 402 are multiple opening and closing valves configured to be openably closable.

FIG. 41 illustrates only a path to the opening and closing valves for two grooves 211 of each groove row 210 of the fixing part 201.

The groove row 210A of the fixing part 201 has grooves 211A1 to 211A3. In the same manner, the groove row 210B includes grooves 211B1 to 211B3, the groove row 210C includes grooves 211C1 to 211C3, and the groove row 210D includes grooves 211D1 to 211D3.

The grooves 211A1, 211B1, 211C1 and 211D1 are respectively coupled to the suction device 52 via a common path 403 and individual paths 401*a*1 to 401*d*1. The individual paths 401*a*1 to 401*d*1 respectively include the switch valves 402 (402*a*1 to 402*d*1) to respectively open or close the paths between the grooves 211A1, 211B1, 211C1, and 211D1 and the suction device 52.

The grooves 211A2, 211B2, 211C2 and 211D2 are respectively coupled to the suction device 52 via the common path 403 and individual paths 401*a*2 to 401*d*2. The individual paths 401*a*2 to 401*d*2 respectively include the switch valves 402 (402*a*2 to 402*d*2) to respectively open or close the paths between the grooves 211A2, 211B2, 211C2, and 211D2 and the suction device 52.

The paths of the grooves 211A3 to 211D3 and the switch valves 402 are the same, but are omitted for the sake of simplicity. Further, among the switch valves 402, the switch valves 402 shaded (blackened) are open, and the switch valves 402 not shaded (white color) are closed.

With this configuration, for example, when the sheet P illustrated by the solid line in FIG. 41 is being sucked, the switch valves 402*a*2 to 402*d*2 are opened so that the grooves 211A2 to 211D2 are coupled to the suction device 52, and the sheet P is suctioned by the grooves 211A2 to 211D2. This state of suction is referred to as "suction present" or "suction enabled". Conversely, the switch valves 402*a*1 to 402*d*1 are closed so that the grooves 211A1 to 211D1 are not coupled to the suction device 52. Thus, a suction operation is not performed (suction disabled) in a region where the sheet P is not borne one the bearing surface of the drum 51.

When the sheet P comes to the position illustrated in FIG. 42 by the rotation of the drum 51, the switch valves 402*a*1 to 402*d*1 are opened to enable suction of the sheet P by the grooves 211A1 to 211D1 as illustrated in FIG. 42. Further, the switch valves 402*a*2 to 402*d*2 are closed to enable suction of the sheet P by the grooves 211A2 to 211D2.

As a result, the sheet suction device 50 can reduce sectioning of foreign matter such as mist from the suction ports 111 in the bearing region 105 on which the sheet P is not placed.

Next, the sheet suction device 50 according to a fifth embodiment of the present disclosure is described with reference to FIGS. 43 and 44.

Figure 43:
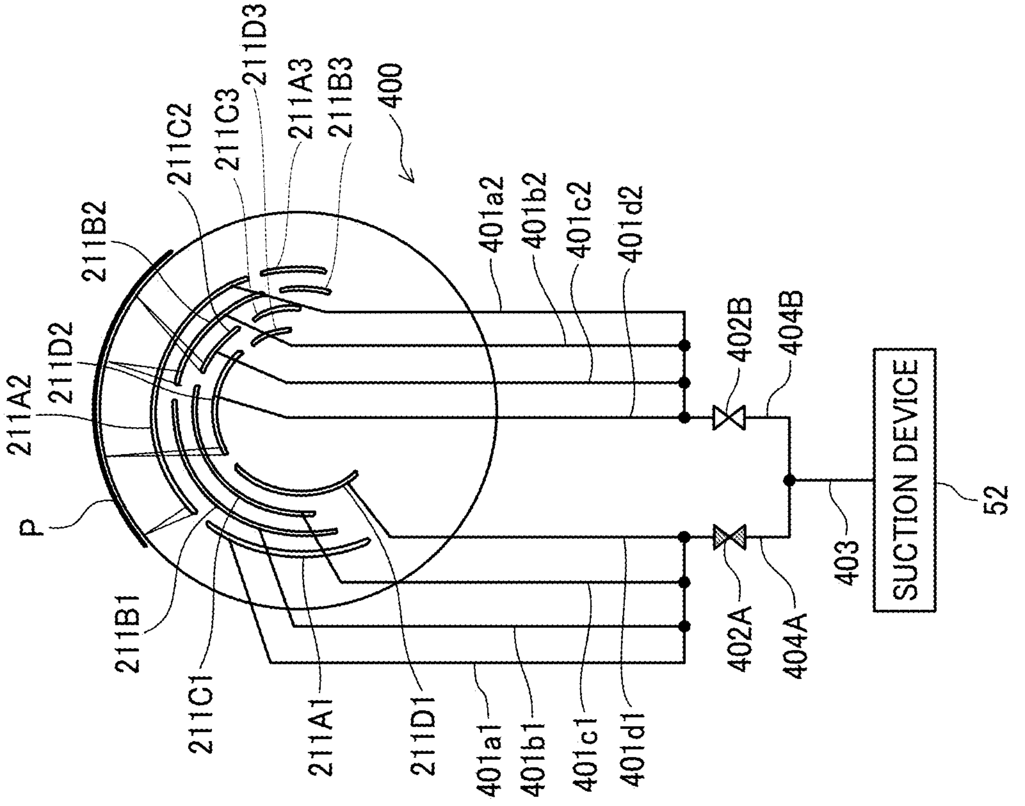
FIG. 43 is a schematic side view of the sheet suction device including a switch that switches suctioning and un-suctioning of the suction port by the sheet suction device in multiple bearing regions of the drum according to a fifth embodiment of the present disclosure.
Figure 44:
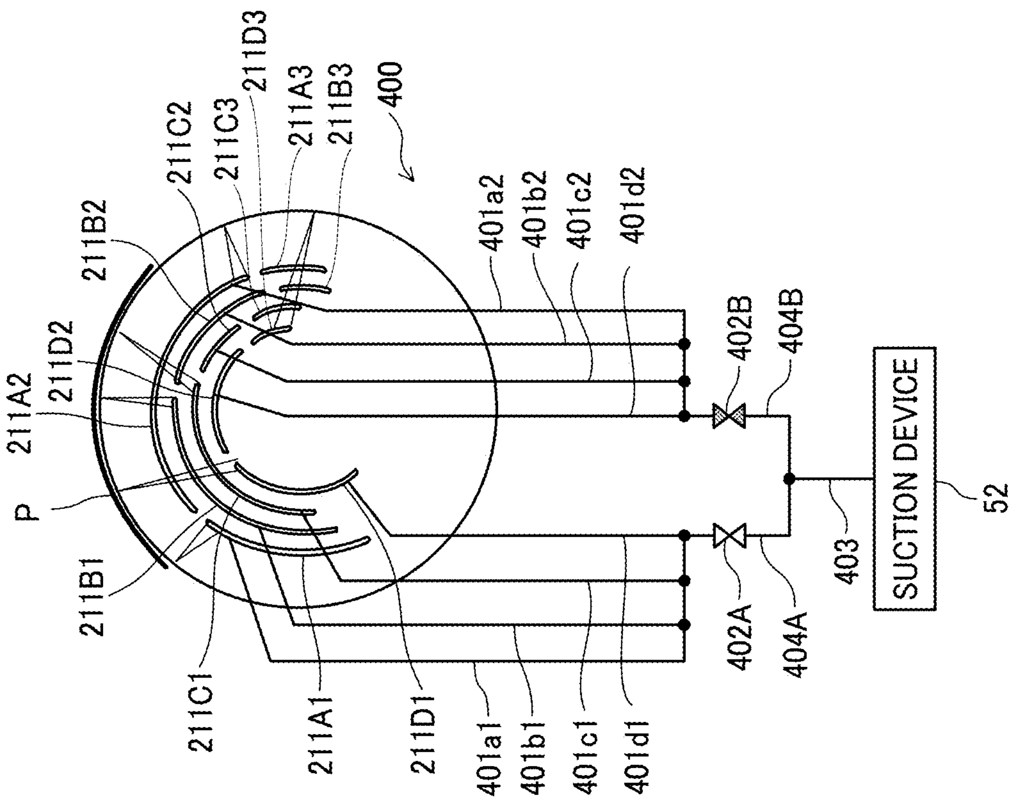
FIG. 44 is a schematic side view of the sheet suction device in a state switched from a state illustrated in FIG. 43.

FIGS. 43 and 44 are schematic side views of the sheet suction device 50 including the switch 400. The switch 400 switches suctioning and un-suctioning of the suction port 111 by the sheet suction device 50 in multiple bearing regions of the drum 51 according to the fifth embodiment.

The sheet suction device 50 according to the fifth embodiment includes the individual paths 401*a*1 to 401*d*1 that are collected to one division common path 404A and then collectively coupled to the common path 403. Thus, the individual paths 401*a*1 to 401*d*1 are divided from the individual paths 401*a*2 to 401*d*2. The individual paths 401*a*2 to 401*d*2 are collected to one division common path 404B and then collectively coupled to the common path 403.

The division common path 404A and 404B respectively include the switch valves 402A and 402B serving as opening and closing valves.

In FIG. 43, the switch valve 402A is closed to disable suction of the sheet P by the grooves 211A1 to 211D1, and the switch valve 402B is opened to enable suction of the sheet P by the grooves 211A2 to 211D2 to bear the sheet P on the drum 51.

When the sheet P comes to the position illustrated in FIGS. 29A and 29B by the rotation of the drum 51, the switch valve 402A is opened to enable suction of the sheet P by the grooves 211A1 to 211D1 as illustrated in FIG. 44. Further, the switch valves 402B is closed to disable suction of the sheet P by the grooves 211A2 to 211D2.

As a result, the sheet suction device 50 can reduce sectioning of foreign matter such as mist from the suction ports 111 in the bearing region on which the sheet P is not placed.

This sheet suction device 50 according to the fifth embodiment includes the switch valves 402A and 402B and the like common to the grooves 211 belonging to the different groove rows 210A to 210D arranged in the radial direction so that the sheet suction device 50 can reduce a number of the switch valves 402 (opening and closing devices). In other words, the sheet suction device 50 can reduce the number of the switch valves 402 (opening and closing device) since enabling and disabling of the suction operation of the bearing region 105 is set according to units of a surface area of the sheet P borne on the drum 51.

The sheet suction device 50 according to a sixth embodiment of the present disclosure is described with reference to FIGS. 45 and 46.

Figure 46:
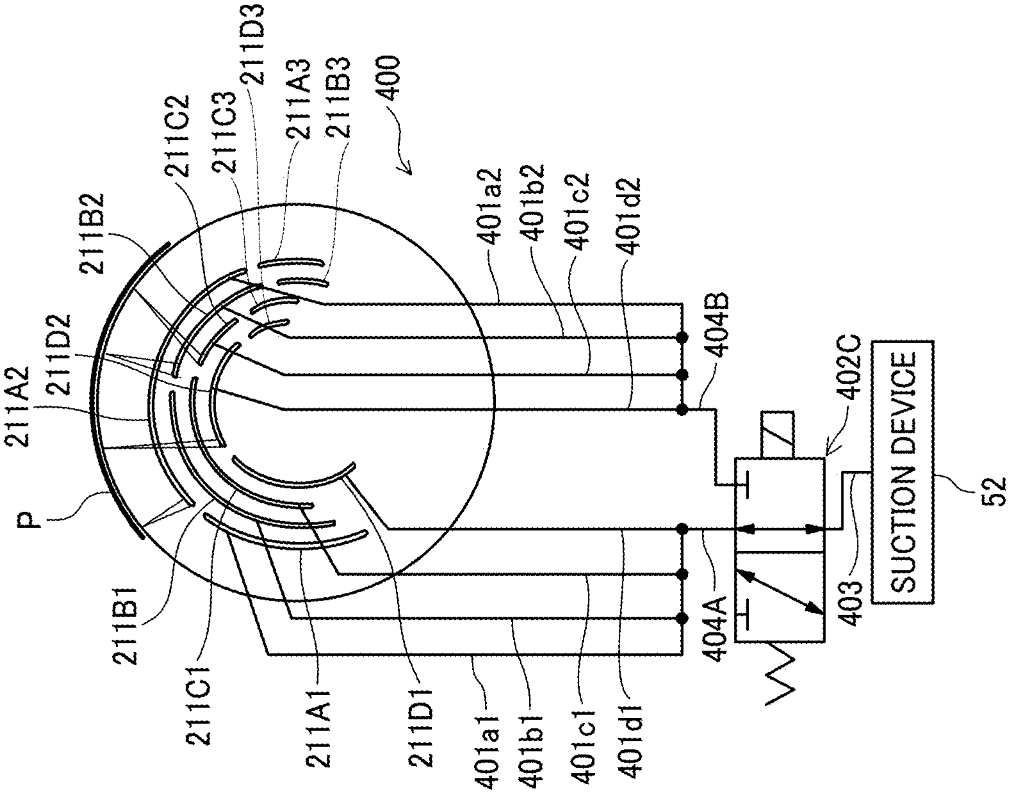
FIG. 46 is a schematic side view of the sheet suction device in a state switched from a state illustrated in FIG. 45.
Figure 45:
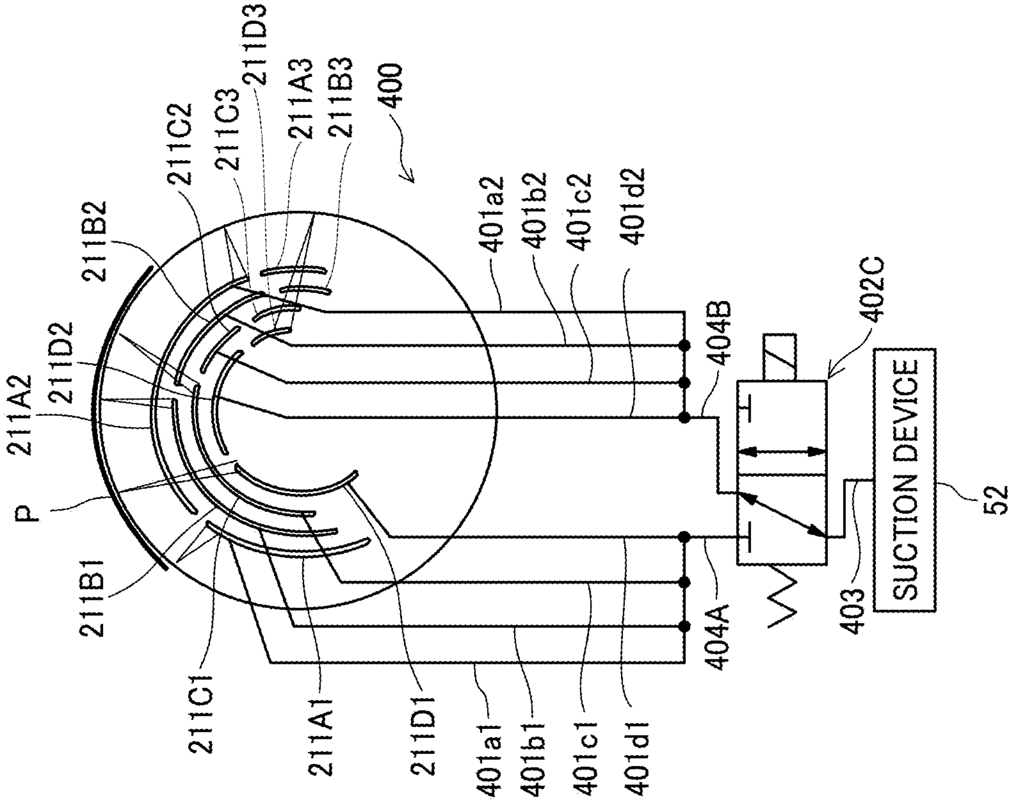
FIG. 45 is a schematic side view of the sheet suction device including a switch that switches suctioning and un-suctioning of the suction port by the sheet suction device in multiple bearing regions of the drum according to a sixth embodiment of the present disclosure.

FIGS. 45 and 46 are schematic side views of the sheet suction device 50 including the switch 400. The switch 400 switches suctioning and un-suctioning of the suction port 111 by the sheet suction device 50 in multiple bearing regions of the drum 51 according to the sixth embodiment.

The sheet suction device 50 according to the fifth embodiment includes the individual paths 401*a*1 to 401*d*1 that are collected to one division common path 404A and then collectively coupled to the common path 403. Thus, the individual paths 401*a*1 to 401*d*1 are divided from the individual paths 401*a*2 to 401*d*2. The individual paths 401*a*2 to 401*d*2 are collected to one division common path 404B and then collectively coupled to the common path 403.

The sheet suction device 50 includes a three way valve 402C as the opening and closing device between the division common paths 404A and 404B and the common path 403.

The three way valve 402C is switched to disable suction of the sheet P by the grooves 211A1 to 211D1 in FIG. 45. Further, the three way valve 402C is switched to enable suction of the sheet P by the grooves 211A2 to 211D2.

When the sheet P comes to the position illustrated in FIG. 46 by the rotation of the drum 51, the three way valve 402C is switched to enable suction of the sheet P by the grooves 211A1 to 211D1 as illustrated in FIG. 46. Further, the three way valve 402C is switched to disable suction of the sheet P by the grooves 211A2 to 211D2.

As a result, the sheet suction device 50 can reduce sectioning of foreign matter such as mist from the suction ports 111 in the bearing region on which the sheet P is not placed. Further, the sheet suction device 50 can reduce the number of switch valves 402 (opening and closing devices).

Next, a switching operation of the first member 203 is described with reference to FIGS. 47 to 50.

Figure 47:
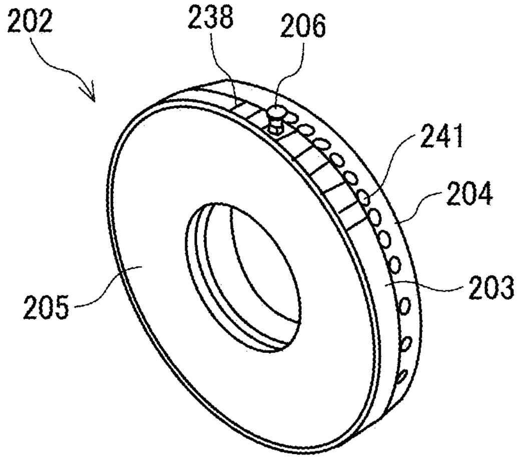
FIG. 47 is a schematic perspective view of a rotating part of the rotary valve illustrating a changing operation of the first member.

FIG. 47 is a schematic perspective view of the rotator 202 of the rotary valve 200.

Figure 48:
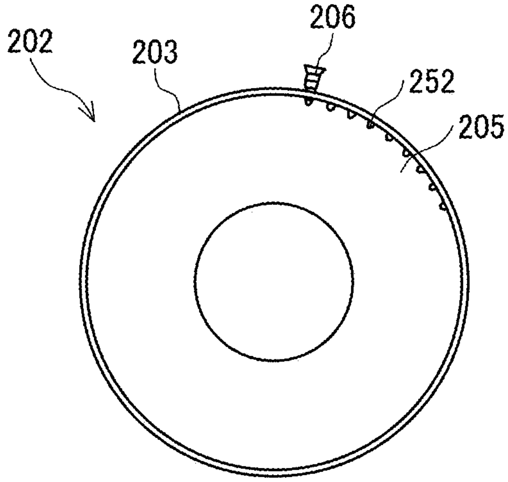
FIG. 48 is a schematic side view of the rotating part of the rotary valve.

FIG. 48 is a schematic side view of the rotary valve 200 of FIG. 47.

Figure 49:
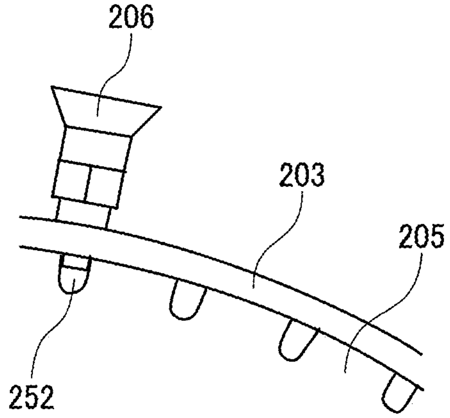
FIG. 49 is an enlarged side view of a main part of the rotating part.

FIG. 49 is an enlarged schematic side view of a main part of the rotator 202 of the rotary valve 200 of FIG. 47.

Figure 50:
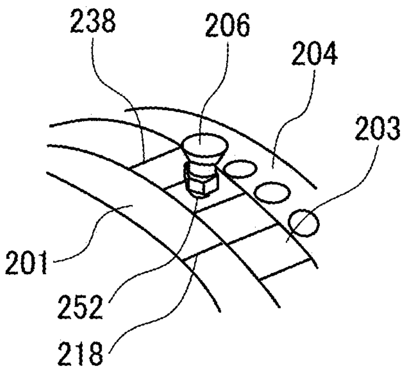
FIG. 50 is an enlarged perspective view of a main part of the rotating part.

FIG. 50 is an enlarged schematic perspective view of a main part of the rotator 202 of the rotary valve 200 of FIG. 47.

The first member 203 of the rotary valve 200 according to the present embodiment is manually rotatable by the user. Thus, the first member 203 is manually rotated by the user to switch the suction regions. An index plunger 206 is used to rotate the first member 203. A rotation operation of the first member 203 is also referred to as a "suction region changing (switching) operation". A leading end of the index plunger 206 is fitted into one of holes 252 formed on a circumferential surface of the third member 205 according to each position of the suction region (suction area) to determine the position of the suction region.

To rotate the first member 203, the user pulls out the index plunger 206 from the hole 252 and rotates the first member 203 relative to the second member 204 and the third member 205 to a target position. Then, the user inserts the leading end of the index plunger 206 into the hole 252 at the target position.

A scale 238 having nine steps, for example, is formed on the circumferential surface of the first member 203 to indicate a rotation position of the first member 203 so that the user can recognize a setting state of the first member 203.

Further, as illustrated in FIG. 50, a scale 218 as a reference for the scale 238 of the first member 203 may be formed on a circumferential surface of the fixing part 201.

Further, the drum 51 is fixed at a predetermined phase (predetermined position) to change the suction region such as a "sheet size changing mode", for example, so that the user can access the index plunger 206. Further, the drum 51 is fixed at the predetermined phase (predetermined position) so that the drum 51 is not rotated by an operational force of the user operating the index plunger 206.

Next, acquisition of size information of the suction region (suction area) is described with reference to FIG. 51.

Figure 51:
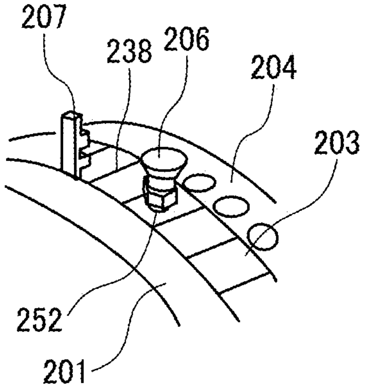
FIG. 51 is an enlarged perspective view of the main part of the rotary valve illustrating acquisition of size information in the suction region.

FIG. 51 is a schematic enlarged perspective view of a main part of the rotary valve 200 illustrating the acquisition of the size information of the suction region (suction area).

In this embodiment, the photosensor 207 is disposed on the fixing part 201 that does not rotate along with the drum 51, and the first member 203 includes a sensing piece (feeler) detectable by the photosensor 207. Such a configuration of the rotary valve 200 including the photosensor 207 can detect the detection piece (feeler) by the photosensor 207 for each one rotation of the drum 51 with a rotation of the first member 203 rotating together with the drum 51. The photosensor 207 detects the feeler and generates one pulse for each one rotation of the drum 51.

Thus, the drum 51 having similar configuration (mechanism) can detect one pulse from the feeler on the drum 51 and detect another one pulse from the feeler on the first member 203 during one rotation of the drum 51 so that the rotary valve 200 can obtain a total of two pulses from two systems (drum 51 and first member 203) during one rotation of the drum 51.

The first member 203 has a phase difference with the second member 204 that rotates together with the drum 51. Thus, intervals between the pulses generated from each of the drum 51 rotating at a constant speed and the first member 203 are measured to detect a rotation angle of the first member 203. Thus, the relative phase difference, that is, the setting information of the suction region can be acquired.

Next, a sheet suction device 50 according to a seventh embodiment of the present disclosure is described with reference to FIGS. 52 to 56.

Figure 52:
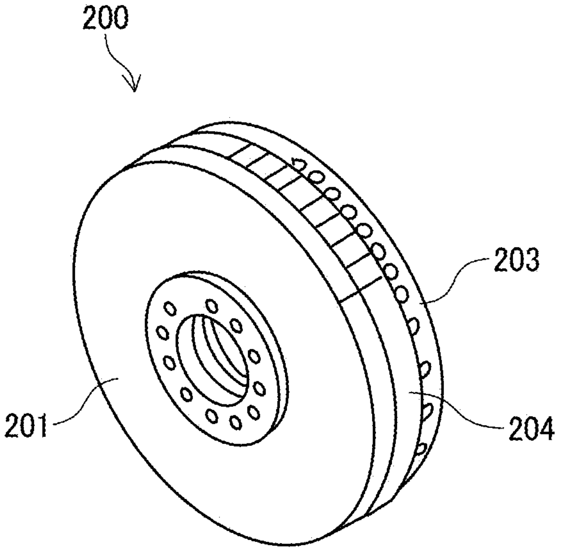
FIG. 52 is an external perspective view of a rotary valve according to a seventh embodiment of the present disclosure.

FIG. 52 is a schematic external perspective view of the rotary valve 200.

Figure 53:
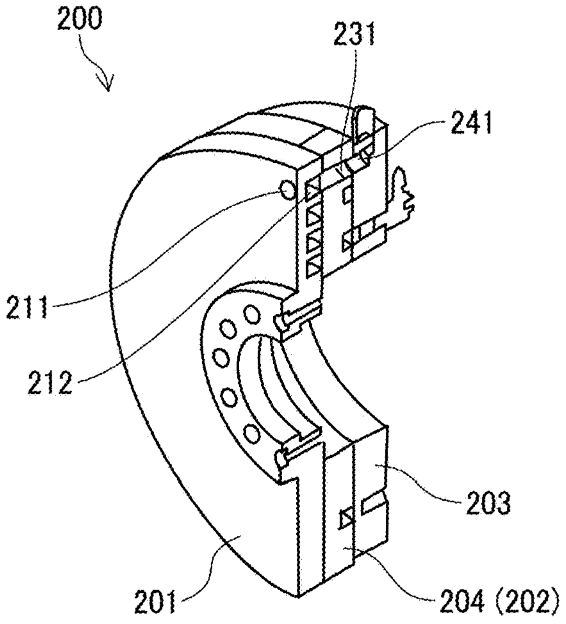
FIG. 53 is a schematic cross-sectional perspective view of the rotary valve cut in half.

FIG. 53 is a cross-sectional perspective view of the rotary valve 200 cut in half.

Figure 54:
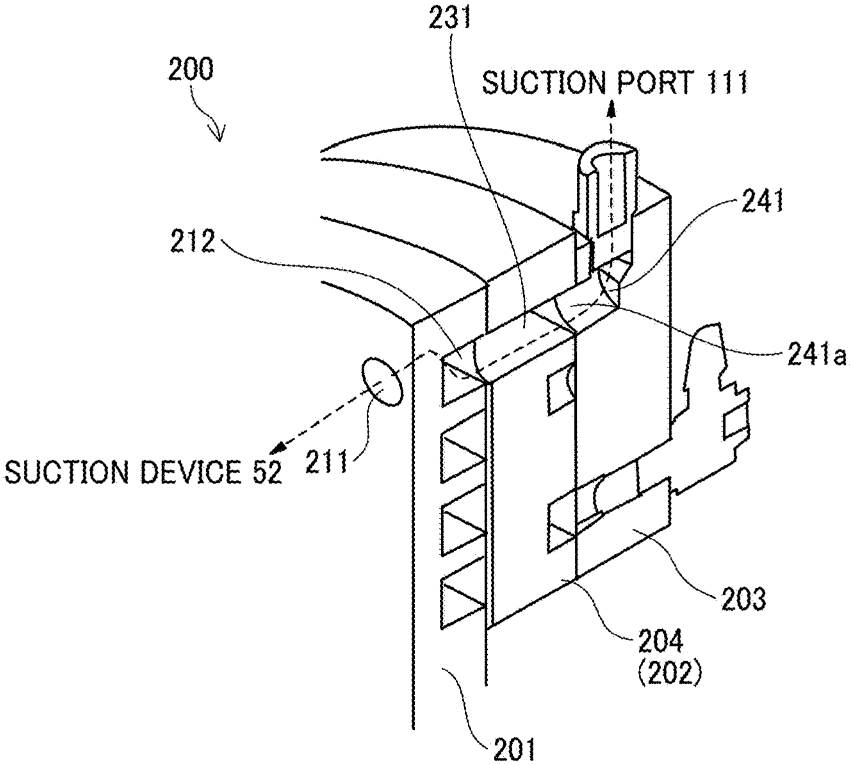
FIG. 54 is a schematic enlarged cross-sectional perspective view of a main part of the rotary valve cut in half.

FIG. 54 is a schematic enlarged cross-sectional perspective view of a main part of the rotary valve 200 cut in half.

Figure 55A:
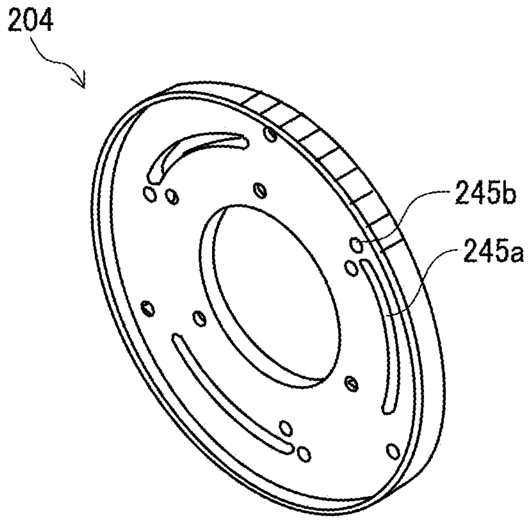
FIGS. 55A and 55B are schematic perspective views of the second member that configures the rotary valve.
Figure 55B:
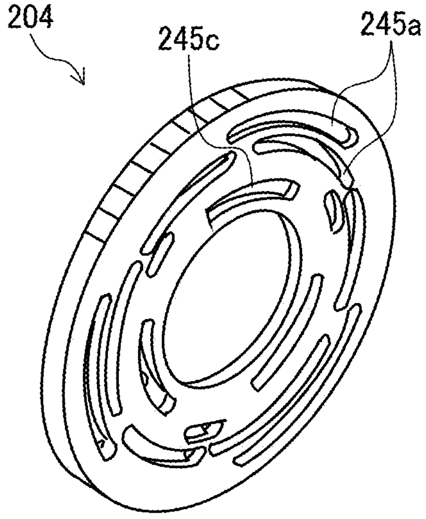

FIGS. 55A and 55B are schematic perspective views of the second member 204 that forms the rotary valve 200.

Figure 56:
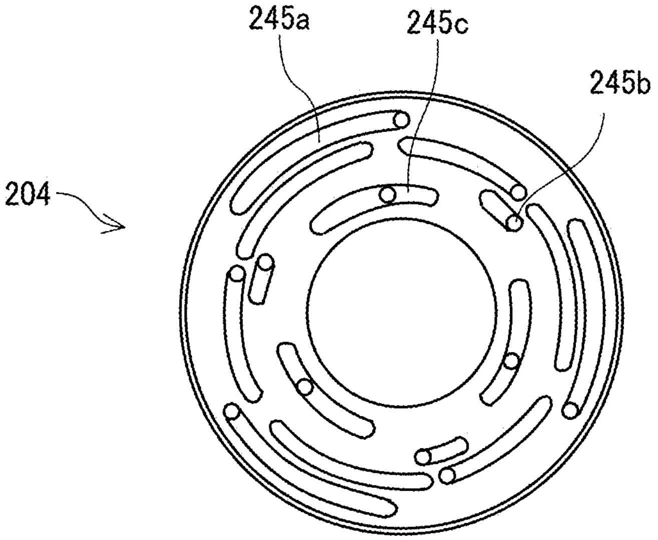
FIG. 56 is a schematic side view of the second member of the second embodiment.

FIG. 56 is a side view of the second member 204.

The second member 204 according to the seventh embodiment includes a combination of the first member 203 and the third member 205 according to the first embodiment. Further, the second member 204 according to the first embodiment is the first member 203 according to the seventh embodiment.

As illustrated in FIGS. 55A and 55B, the second member 204 is a disk-shaped member that includes through grooves **245*a*, grooves 245*b*, and through holes 245*c* corresponding to each bearing region 105 (bearing area) on a side surface of the second member 204 (disk-shaped member). The through grooves 245*a* are along a circumferential direction of the second member 204. Each of the grooves 245*b* has a bottom. The through hole 245*c* is on the side surface of the second member 204. The through hole 245*c* penetrate through the second member 204**.

As illustrated in FIGS. 55A and 55B, the second member 204 includes grooves **245*a*, for example, arranged at four locations on the concentric circles from the outer circumference toward the center in the radial direction of the second member 204**.

Therefore, the first member 203 is rotate relative to the second member 204 to change the size of the suction region that is the number of the suction holes 112 connected to the suction device 52, in the seventh embodiment of the present disclosure.

Thus, the switch is a rotary valve 200 configured to switch the multiple suction regions to be sucked according to a rotation of the first member 203 relative to the second member 204.

In the above-described case, the second member 204 rotates together with the drum 51. Since a distance between the suction port 111 of the drum 51 and a connection port of the hose 55 of the rotator 202 of the rotary valve 200 varies according to the rotation of the first member 203, the rotary valve 200 according to the seventh embodiment has a configuration of a piping adjustable according to a variation (change) of the distance between the suction port 111 and the connection port of the hose 55.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A sheet suction device comprising:

a drum having multiple suction ports in a circumferential surface of the drum, the drum to bear a sheet on the circumferential surface and rotate in a circumferential direction of the drum; and a suction generator to suck the sheet through the multiple suction ports to attract the sheet on the circumferential surface, wherein the drum includes multiple suction regions aligned in the circumferential direction on the circumferential surface, each of the multiple suction regions includes the multiple suction ports aligned in the circumferential direction and in an axial direction of the drum on the circumferential surface, the multiple suction regions include an upstream region, a middle region, and a downstream region in the circumferential direction, and the middle region has the multiple suction ports at both outer sides in the axial direction of the drum, wherein the multiple suction regions is gradually enlarged from the downstream region toward the upstream region in a direction opposite to the circumferential direction.

2. The sheet suction device according to claim 1, wherein the suction generator sucks, at different times, the multiple suction ports in the downstream region, the multiple suction ports in the middle region, and the multiple suction ports in the upstream region, in this order, and the suction generator sucks, at the same time, the multiple suction ports at said both outer sides and the multiple suction ports at an inner side between said both outer sides in the axial direction of the drum in the middle region.

3. The sheet suction device according to claim 1, wherein the suction ports in the middle region are aligned in the axial direction of the drum.

4. The sheet suction device according to claim 1, wherein a number of the suction ports in the middle region decreases toward the upstream region in the circumferential direction.

5. The sheet suction device according to claim 1, wherein the multiple suction ports at said both outer sides in the middle region are aligned in the circumferential direction of the drum.

6. The sheet suction device according to claim 1, further comprising a pressing roller to press the sheet against the circumferential surface of the drum at a suction start position at which the suction generator starts suctioning the sheet through the multiple suction ports.

7. The sheet suction device according to claim 1, further comprising a switch to switch the multiple suction regions to be sucked according to a size of the sheet.

8. The sheet suction device according to claim 7, further comprising:

a first structure between the multiple suction ports and the suction generator; and a second structure having multiple holes connectable to the multiple suction ports, the second structure rotatable along with a rotation of the drum, wherein the first structure is rotatable relative to the second structure to change a number of the suction ports communicating with the suction generator.

9. The sheet suction device according to claim 8, wherein the switch is a rotary valve to switch the multiple suction regions to be sucked according to a rotation of the first structure relative to the second structure.

10. The sheet suction device according to claim 9, wherein the switch comprises:

a fixing part including multiple grooves aligned in a circumferential direction of the fixing part on a side surface of the fixing part; and a switch valve to openably close a path between the fixing part and the suction generator.

11. The sheet suction device according to claim 1, wherein the drum comprises:

a drum body having the multiple suction ports; and a suction plate having multiple suction holes, wherein the suction plate is on a circumferential surface of the drum body, and the suction generator sucks the sheet through the multiple suction holes of the suction plate and the multiple suction ports of the drum body.

12. The sheet suction device according to claim 11, wherein the multiple suction holes are uniformly formed in the suction plate, and the multiple suction ports are ununiformly formed in the drum body.

13. The sheet suction device according to claim 12, wherein the multiple suction ports are rectangular through holes in the drum body.

14. The sheet suction device according to claim 1, wherein the drum comprises:

multiple bearing regions each to bear the sheet on the circumferential surface of the drum, wherein each of the multiple bearing regions includes the multiple suction regions aligned in the circumferential direction.

15. A sheet conveyor comprising:

the sheet suction device according to claim 1, wherein the drum is to rotate to convey the sheet borne by the drum.

16. A printer comprising:

the sheet conveyor according to claim 15; and a liquid discharge device to discharge a liquid onto the sheet.

* * * * *